(12) United States Patent
Levy et al.

(10) Patent No.: US 7,747,729 B2
(45) Date of Patent: Jun. 29, 2010

(54) DETERMINING CLIENT LATENCIES OVER A NETWORK

(76) Inventors: Hanoch Levy, 13 Budenheimer, 62008 Tel Aviv (IL); Marik Marshak, 36 Tanglewood Rd., Newton, MA (US) 02459

( * ) Notice: Subject to any disclaimer, the term of this patent is extended or adjusted under 35 U.S.C. 154(b) by 1330 days.

(21) Appl. No.: 10/170,460

(22) Filed: Jun. 14, 2002

(65) Prior Publication Data
US 2003/0233445 A1 Dec. 18, 2003

(51) Int. Cl.
*G06F 15/173* (2006.01)
(52) U.S. Cl. ...................... 709/224; 709/232
(58) Field of Classification Search .............. 709/224; 370/229, 232; 702/176, 186
See application file for complete search history.

(56) References Cited

U.S. PATENT DOCUMENTS

| | | | | |
|---|---|---|---|---|
| 5,570,346 | A * | 10/1996 | Shur | 370/231 |
| 5,696,948 | A * | 12/1997 | Cruz et al. | 702/176 |
| 6,012,096 | A * | 1/2000 | Link et al. | 709/233 |
| 6,038,599 | A * | 3/2000 | Black et al. | 709/223 |
| 6,061,722 | A * | 5/2000 | Lipa et al. | 709/224 |
| 6,178,160 | B1 * | 1/2001 | Bolton et al. | 370/255 |
| 6,182,125 | B1 * | 1/2001 | Borella et al. | 709/218 |
| 6,222,825 | B1 * | 4/2001 | Mangin et al. | 370/235 |
| 6,243,761 | B1 * | 6/2001 | Mogul et al. | 709/246 |
| 6,272,539 | B1 * | 8/2001 | Cuomo et al. | 709/223 |
| 6,272,652 | B1 * | 8/2001 | Starr | 714/701 |
| 6,321,264 | B1 * | 11/2001 | Fletcher et al. | 709/224 |
| 6,405,252 | B1 * | 6/2002 | Gupta et al. | 709/224 |
| 6,438,629 | B1 * | 8/2002 | Huebner et al. | 710/52 |
| 6,587,878 | B1 * | 7/2003 | Merriam | 709/224 |
| 6,601,098 | B1 * | 7/2003 | Case et al. | 709/224 |
| 6,681,232 | B1 * | 1/2004 | Sistanizadeh et al. | 707/104.1 |
| 6,731,600 | B1 * | 5/2004 | Patel et al. | 370/230 |
| 6,928,280 | B1 * | 8/2005 | Xanthos et al. | 455/423 |
| 7,088,706 | B2 * | 8/2006 | Zhang et al. | 370/352 |
| 7,333,517 | B2 * | 2/2008 | Madhavapeddi et al. | 370/509 |
| 7,353,272 | B2 * | 4/2008 | Robertson et al. | 709/224 |
| 7,359,985 | B2 * | 4/2008 | Grove et al. | 709/238 |
| 7,457,877 | B1 * | 11/2008 | Shah et al. | 709/226 |
| 7,519,702 | B1 * | 4/2009 | Allan | 709/224 |
| 7,536,453 | B2 * | 5/2009 | Fingerhut et al. | 709/223 |
| 2001/0050903 | A1 * | 12/2001 | Vanlint | 370/252 |
| 2002/0026531 | A1 * | 2/2002 | Keane et al. | 709/250 |
| 2002/0105911 | A1 * | 8/2002 | Pruthi et al. | 370/241 |
| 2002/0112049 | A1 * | 8/2002 | Elnozahy et al. | 709/224 |
| 2003/0046383 | A1 * | 3/2003 | Lee et al. | 709/224 |
| 2006/0190598 | A1 * | 8/2006 | Cabrera et al. | 709/224 |

OTHER PUBLICATIONS

Postel, J., Internet Control Message Protocol, Sep. 1981, DARPA Internet Program Protocol Specification RFC 792.*

Ahsan Habib, Marc Abrams, "Analysis of Sources of Latency in Downloading Web Pages", Jul. 1999 in Proc. of WebNet Conference on the WWW and Internet (WebNet'00) San Antonio USA, Nov. 2000 Technical Report TR-99-4, Computer Science Dept., Virginia Tech.*

* cited by examiner

*Primary Examiner*—Patrice Winder
*Assistant Examiner*—Benjamin Ailes
(74) *Attorney, Agent, or Firm*—Stolowitz Ford Cowger LLP

(57) ABSTRACT

A network latency estimation apparatus for estimating latency in a network communication between a server and a client. The apparatus includes an event observer to observe occurrences of pre-selected events occurring at the server. A logging device associated with the event observer logs into a data store the occurrence of the events together with corresponding time information. A latency estimator associated with the logging device uses the logged occurrences with the corresponding time information to arrive at an estimation of the latency for the communication.

38 Claims, 19 Drawing Sheets

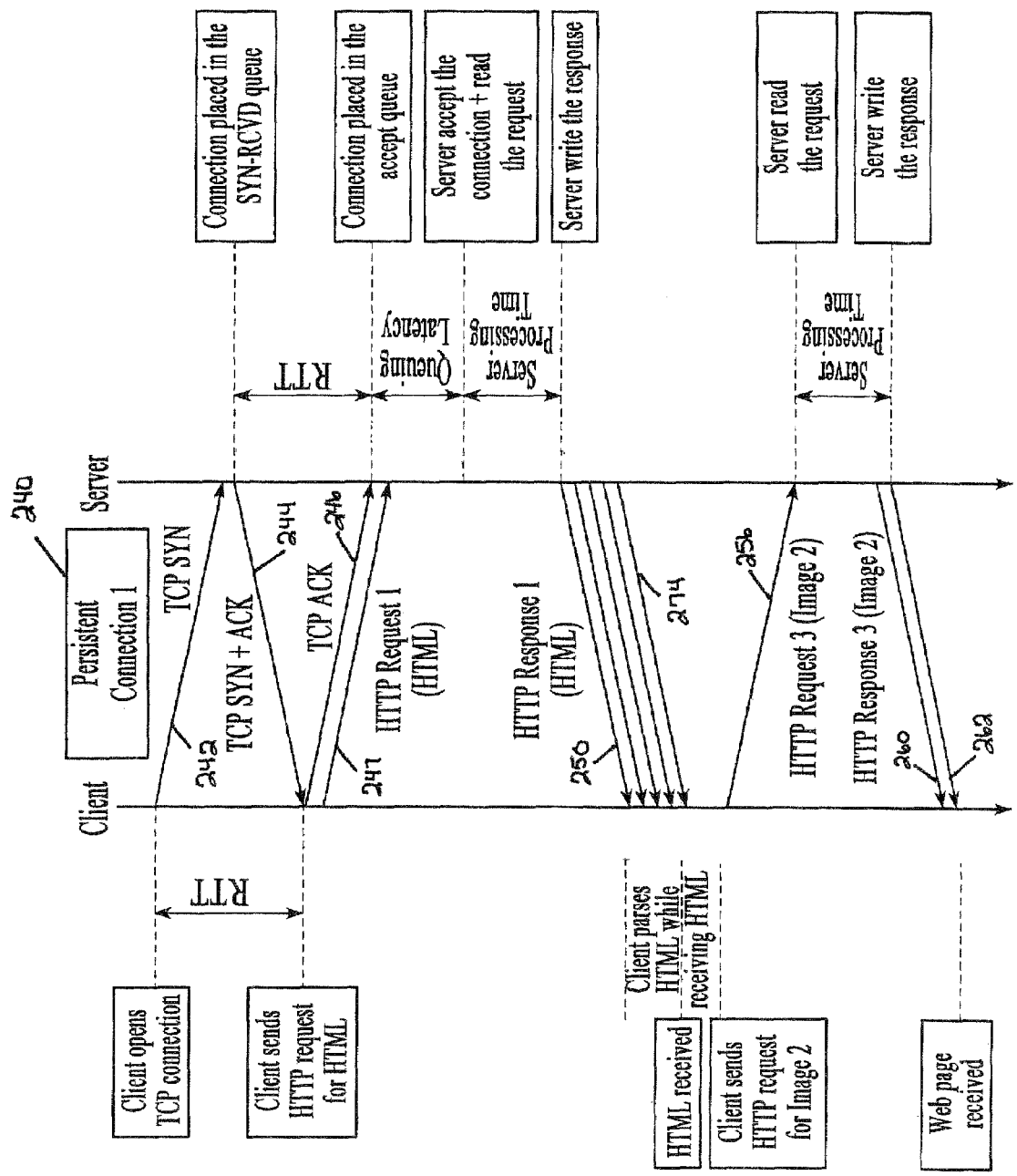
FIG.3/1

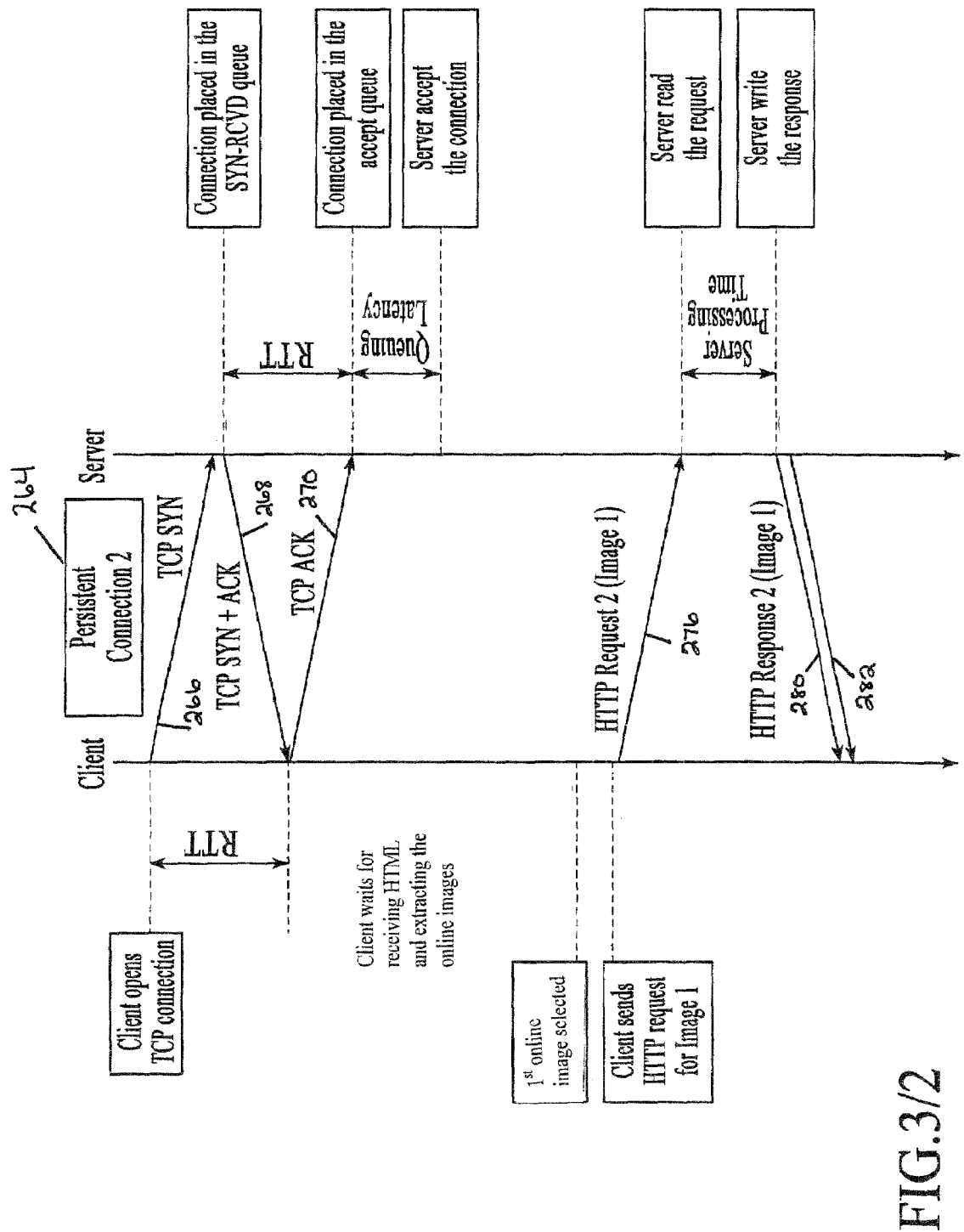
FIG.3/2

DETERMINING CLIENT LATENCIES OVER A NETWORK

FIELD OF THE INVENTION

The present invention relates to determining client latencies over networks, particularly during the course of downloading procedures, and more particularly but not exclusively, to determining client latencies in downloads of web pages over the Internet.

BACKGROUND OF THE INVENTION

A central performance problem in the World Wide Web, in recent years, has been client latency. Client latency may be defined, as the time a client has to wait between requesting data from a server and completing downloading the requested data, and all data associated with the request.

Impatience with poor performance is the most common reason a user's visit to a web site is terminated. For e-commerce sites, these terminations translate into lost revenue, Measurements of client latencies are critical to minimize client latencies, so that users are satisfied with their experience, and do not prematurely terminate the download. Once the client latency is understood, a site can reduce its latency in a number of ways, for example:

(a) deploying a mirror site
(b) buying wider connectivity to the Internet
(c) deploying a more powerful web server
(d) load balancing
(e) altering the objects on the site
(f) altering the placement of the objects on the site.

As of today, the primary way of conducting client latency measurements is to use agents external to the site. The agents are deployed at a limited number of locations around a network, be it an intranet, or on the Internet, and the agents fetch specific web pages from a web server, specifically to measure the latency from the limited number of locations where those agents reside. The disadvantages of this method are:

(1) The server is dependent upon an external body for conducting the measurements
(2) The agent's measurements do not necessarily reflect actual client experience
(3) The perceived latency measured by the agents does not have a breakdown of the various latency components
(4) The agents' DNS lookup time is effected by prior DNS lookup queries.

Client latencies will vary based on what version of HTTP a client is using. In HTTP 1.0 a client would establish a new TCP connection for each HTTP request. Using a new TCP connection for each request led to incurring connection-establishment latencies on each request. Connection establishment times will be described in greater detail below. With HTTP 1.1, clients establish a persistent TCP connection with the server, and those connections are re-used for multiple HTTP requests, and responses.

What is needed is a solution that does not require agents to be placed at external locations on the network. Preferably, such a solution should analyze, for each client of the server, what latencies are experienced by the individual client. It would be additionally beneficial if such a measuring device required no additional hardware, and could be optionally run during actual server operation, or during off peak times.

An attempt at a description of such a solution was made by Balachander Krishnamurthy and Jennifer Rexford in their paper "En Passant: Predicting HTTP/1.1 Traffic," Proc. Global Internet Symposium, 1999. Their means required accurate clock synchronization, between a client and a server, and low level TCP/IP traces.

SUMMARY OF THE INVENTION

According to a first aspect of the present invention there is thus provided a network latency estimation apparatus for estimating a client's latency in a network communication between a server and said client. An event observer observes occurrences of pre-selected events associated with said communication occurring at said server. A logging device, associated with said event observer, logs into a data store the occurrence of said events together with respective time information. And a latency estimator associated with said logging device uses said logged occurrences with said respective time information to arrive at an estimation of a client's latency for said communication.

Preferably, said client's latency comprises the difference between a first time at which a client sends request data and a second time at which said client completes receipt of the requested data.

Preferably, the latency estimator further comprises a round-trip-time estimator, capable of estimating a round trip time for said client, said estimation being based on receipt at the server of a request for data from the client in consequence of data previously sent to the client by the server.

Preferably, said round-trip-time-estimator is operable to estimate the round trip time by determining the shortest duration over a plurality of durations, measured between when a server sends data to a client, and when the server receives a subsequent request from the client, said subsequent request being in consequence of said data sent to the client by the server.

Preferably, the apparatus comprises a pinger associated with said event observer.

Preferably, said events comprise sending out a ping, and receiving a response responsive to the ping.

Preferably, the round-trip-time estimator is operable to estimate the round trip time based on the shorter of:

(a) a duration between a first time when the server sends data to a client, and a second time when the server receives a subsequent request from the client, and
(b) the logged times of said ping event.

Preferably, said data store contains at least some of:

(a) an IP address of the client,
(b) a number of bytes in a server's response,
(c) a server's processing time,
(d) a flag indicating whether the current request is the first request on a current channel,
(e) a time the server accepts a connection from the client,
(g) a time the server starts processing a client's request,
(h) a time the server completes writing the response to the channel, and
(i) a number of bytes left to be sent when the server completes writing requests to the channel.

Preferably, said latency estimator is operable to form an initial estimate of the client's latency by adding an estimated round trip time, to a delay between when the server receives an initial request for data from said client, and when the server receives a subsequent request for data from said client Preferably, the apparatus comprises a receipt indicator, associated with said event observer, operable to add to the end of data being sent an automatic end of data receipt indicator, for obtaining an acknowledgment of receipt of the end of the data by said client.

Preferably, the apparatus comprises a client-data-reception-time estimator operable to estimate a time when the client received said data sent as the time when the server receives the acknowledgement of the receipt of said data.

Preferably, said latency estimator is further operable to estimate the client's latency by using the earliest of the times determined from:

when the server receives the acknowledgment of receipt of the data, and when the server receives any other request from the client.

Preferably, said latency estimator is further operable to estimate the client's latency by using the earliest of the times determined by when the server received the acknowledgment of receipt of the data sent, and when the server received any other request from the client wherein said other request is in consequence of said data sent.

Preferably, the apparatus comprises a queuing latency probe, associated with said logging device, capable of sending a queue probing request to the server.

Preferably, said pre-selected events further comprise:

sending, by the queuing latency probe, of said queue probing request, and the server accepting said queue probing request.

Preferably, said request is an HTTP request.

Preferably, the apparatus comprises an adder for adding an elapsed time between when said queuing latency probe request is sent to the server, and when said request is accepted for handling by the server, to said initial latency as measured by the client-latency estimator.

Preferably, the apparatus comprises a transmission-data-rate estimator, connected to the latency estimator, said data rate estimator comprising a divider and a subtractor, said subtractor being connected to receive as inputs the round trip time, and the initial estimate of the client's latency, and to produce an output being the difference therebetween, said divider being connected to receive as a first input an amount of data sent by the server in the course of the transmission, and as a second input said subtractor output, and to produce an estimate of a transmission data rate by dividing therebetween.

Preferably, the apparatus comprises an overall-client-data-rate estimator comprising an averager for averaging together a plurality of successively estimated transmission data rates for the given client connection thereby to estimate an overall data rate for said given client.

Preferably, the apparatus comprises a client-data-reception-time estimator, comprising a multiplier and an adder, said adder being functional to add a time at which the server dispatched an end part of the requested data to the channel, to an output of the multiplier, wherein the multiplier is operable to multiply an amount of data left to send, by said overall data rate, the client-data reception time estimator thereby obtaining an estimate of client-data-reception-time.

Preferably, the apparatus comprises a subtractor and an adder, said subtractor operable to subtract the time at which the server received an initial request for data from a client from said time the client received the last of the requested data, said adder operable to add one and a half times the estimated round trip time, and further add the latency as estimated by the queuing latency probe, to the output of the subtractor.

Preferably, the apparatus comprises a client-connection-data-rate estimator comprising an averager for averaging together all the transmission data rates for a given client connection wherein the corresponding transmissions meet a specific size criteria.

Preferably, the apparatus comprises a client-data-reception-time estimator comprising an adder and a multiplier, said adder for adding the time the server last dispatched data to the client, to the output of the multiplier, wherein said multiplier is operable to multiply an amount of data left to send by said data rate for a given client connection, thereby to produce an estimate of a time of receipt of said last data to the client.

Preferably, the apparatus comprises a client latency estimator for estimating a respective client latency's, the latency estimator having a subtractor and an adder, said subtractor for subtracting the time the server received an initial request for data from a client from said estimate of a time of receipt of said last data to the client, said adder for adding together one and a half times the estimated round trip time, the latency as estimated by the queuing latency probe, and the output of the subtractor, thereby to form an estimate of said respective client's latency.

Preferably, the apparatus comprises a global-transmission-rate estimator comprising an averager, said averager for averaging together successive data transmission rates, thereby to estimate a global transmission rate.

Preferably, the apparatus comprises a client-data-reception-time estimator comprising an adder, and a multiplier, said multiplier operable to multiply an amount of data left to send by said global transmission data rate and said adder operable to add the time the server dispatched the last data to the client, to the output of the multiplier, thereby to provide an estimate of a client data reception time.

Preferably, the apparatus comprises a subtractor and an adder, said subtractor for subtracting the time the server received an initial request for data from a client from said time of receipt of said last data at said client, said adder connected to add one and a half times the estimated round trip time, to the latency as estimated by the queuing latency probe, thereby to provide a revision of the estimate of the client's latency.

Preferably, the apparatus comprises a global-transmission-rate estimator comprising an averager operable to estimate a global transmission data rate, said averager operable to average together a series of successively obtained transmission data rates wherein respective transmissions meet a pre-determined size criteria.

Preferably, the apparatus comprises a client-data-reception-time estimator operable to estimate the time the client received a last part of the requested data, the estimator comprising a multiplier and an adder, the multiplier being connected to multiply the amount of data left to send by said global transmission data rate, and to output a result to provide a first input to said to adder, said adder being arranged to add said input to said time at which the server dispatched said last data part to the client, thereby to provide an estimate of said client data reception time.

Preferably, said subtractor subtracts the time the server received an initial request for data from a client from said time the client received the last part of said requested data, said adder further adding, to the output of the subtractor, one and a half times the estimated round trip time, and the time duration between a first time when the queuing latency probe sends the request to the server, and a second time when the server accepts the request sent by the probe.

Preferably, a plurality of data transmission rates are measured for a given channel, the apparatus further comprising a channel-data-rate estimator comprising an averager for averaging together all the data rates for each transmission on said given channel.

Preferably, the apparatus comprises an overall-client-data-rate estimator comprising an averager, said averager being operable to average together a plurality of successively measured data rates for a given client's channels.

Preferably, the apparatus comprises a global-data-rate estimator for estimating a global data rate, the estimator comprising an averager for averaging together a plurality of successively measured data rates.

Preferably, the apparatus comprises a transmission-packet-rate estimator operable to estimate a packet rate for a transmission, the estimator comprising a divider and a subtractor, wherein said subtractor is operable to subtract the round trip time from the initial estimate of the client's latency for the transmission to produce a subtractor output, said divider being connected to divide the number of packets the server sends in the course of the transmission, by said subtractor output.

Preferably, the apparatus comprises an overall-client-packet-rate estimator operable to to estimate the overall packet rate for a given client connection, the estimator comprising an averager, for averaging together a plurality of successively measured transmission packet rates for the given client connection.

Preferably, the apparatus comprises a client-data-reception-time estimator operable to estimate a time the client received the last of the data, the estimator comprising a multiplier and an adder, said multiplier operable to multiply a number of packets remaining to be sent by said overall packet rate, thereby to produce a multiplier output, and said adder being connected to add the time the server wrote the end of the data to the client, to said multiplier output.

Preferably, the latency estimator estimates the client latency, said subtractor further subtracting the time the server received an initial request for data from a client from said time the client received the last of the data, thereby to produce a subtractor output, said adder further adding to the result of the subtractor one and a half times the estimated round trip time, and further adding thereto the latency as estimated by the queuing latency probe.

Preferably, a client-connection-packet-rate estimator estimates the packet rate for a given client connection, the estimator comprising an averager operable to average together ones of a succession of packet rates for given transmissions of a client connection wherein respective transmissions meet a pre-selected size criteria.

Preferably, the apparatus comprises a client-data-reception-time estimator operable to estimate a time the client received the last of the data, the estimator comprising an adder and a multiplier, said multiplier operable to multiply the number of packets left to send by said packet rate for a given client connection, to produce a multiplier output, said adder adding the time the server wrote the last data to the client, to said multiplier output.

Preferably, the apparatus estimates the client latency, said subtractor further operable to subtract the time the server received an initial request for data from a client from said estimated time the client received the last of the data, said adder being further operable to add to the output of the subtractor one and a half times the estimated round trip time, and said adder further operable to add thereto a queuing latency duration between a queuing latency probing request sending time when the queuing latency probe sends said probing request to the server, and a second, queuing latency probe request receipt time, when the server accepts said probing request.

Preferably, the apparatus comprises a global-transmission-rate estimator, comprising an averager operable to estimate a global transmission packet rate, said averager operable to average together all the transmission packet rates of all the connections to the server.

Preferably, the apparatus comprises a client-data-reception-time estimator operable to estimate the time the client received the last of the data, the estimator comprising an adder and a multiplier, said multiplier operable to multiply the number of packets left to send by said global transmission packet rate, to form a multiplier output, said adder for adding the time the server wrote the last data to the client, to said multiplier output.

Preferably, the apparatus estimates the client latency. For this purpose it comprises a further adder and a further subtractor, said further subtractor operable to subtract the time the server received an initial request for data from a client from said time the client received the last of the data thereby to form a subtractor output, said adder operable to add to the output of the subtractor one and a half times the estimated round trip time, and the duration between the a first time when the queuing latency probe sends the request to the server, and a second time when the server accepts the request sent by the probe.

Preferably, the apparatus comprises a global-transmission-rate estimator operable to estimate a global transmission packet rate, said averager being further operable to average together the transmission rates from all transmissions meeting a predetermined size criteria.

Preferably, the apparatus comprises a client-data-reception-time estimator operable to estimate the time the client received the last of the data, the estimator comprising an adder and a multiplier, said multiplier multiplying the number of packets left to send by said global transmission packet rate, said adder operable to add the time the server wrote the last data to the client, to the output of the multiplier.

Preferably, the apparatus comprises a subtractor and a further adder, said subtractor being operable to subtract the time the server received an initial request for data from a client from said time the client received the last of the data, said adder being operable to add to the output of the subtractor one and a half times the estimated round trip time, and the time duration between the a first time when the queuing latency probe sends the latency test request to the server, and a second time when the server accepts the latency test request.

Preferably, the apparatus comprises a channel-packet-rate estimator operable to estimate the packet rate for a given channel, the estimator comprising a subtractor, and a divider, wherein said subtractor is operable to subtract the round trip time from the latency measured for said client for said channel, thereby to produce a subtractor output, said divider being connected to divide a number of packets the server sends on the channel, by the output of the subtractor.

Preferably, each client connects via a plurality of channels, the apparatus further comprising an overall-client-packet-rate estimator operable to estimate an overall packet rate for a given client, the estimator comprising an averager for averaging together a plurality of successively measured packet rates for each of said plurality of channels.

Preferably, the apparatus comprises a global-packet-rate estimator operable to estimate the global packet rate, the estimator comprising an averager operable to average together a plurality of successively measured packet rates.

Preferably, the apparatus is operable to log HTTP transmissions.

According to a second aspect of the present invention there is provided a method for estimating the latency of a user client on a network communication, using measurements made in association with a server with which said client is in communication. The method includes logging in association with a server, events, and the times of occurrence of said events and processing said logged times to estimate said latency.

Preferably, said user client latency is the latency between a first time when a client sends a request for data to a server and a second time at which said client receives a last datum of the requested data.

Preferably, the method comprises estimating a round-trip-time, comprising estimating a round trip time, said estimation being based on when a request for data from the client is received by the server in consequence of data previously sent to the client by the server.

Preferably, the method comprises estimating the round trip time by finding a shortest duration between a third time when the server sends data to said client, and a fourth time when the server receives a subsequent request from said client, said subsequent request being made by said client in consequence of data sent to the client by the server.

Preferably, the method comprises pinging the client.

Preferably, the method comprises recording time information about a duration between sending said ping and receiving a response from a respective client.

Preferably, the method comprises estimating a data round trip time based on the shorter of:
(a) a shortest duration between when the server sends data to a client, and when the server receives a corresponding subsequent request from the client, and
(b) a time duration recorded by said pinging.

Preferably, wherein the logging includes logging a selection from the group consisting of:
(a) an IP address of the client,
(b) a number of bytes in a response,
(c) a server's processing time,
(d) a flag indicating if a current request is a first request on a current channel,
(e) a time the server accepts a connection from the client,
(g) a time the server starts processing a request,
(h) a time the server completes writing a request to a channel, and
(i) a number of bytes left to be sent when the server completes writing requests to a channel.

Preferably, the method comprises estimating a client-latency including:
determining a duration between when the server receives an initial request for data from a client, and when the server receives a subsequent request for data from that client, as a response request duration, and
adding thereto an estimated round trip time, thereby to form an approximation of said client latency.

Preferably, the method comprises adding, at the end of the data being sent, an indication to the client to send an additional request to the server.

Preferably, the method comprises estimating a client-data-reception-time comprising approximating a time when the client receives data sent as a time when the server receives a request resulting from said indication.

Preferably, estimating the client-latency comprises providing a first client latency estimate as an earliest of:
a time when the server receives the request in response to said indicator, and
a time when the server receives any other request from the client wherein said other request is in consequence of said data sent.

Preferably, the method comprises queuing latency probing comprising
sending a request to the server,
measuring a first time at which said request is sent to the server,
measuring a second time at which said request is handled by the server, and
recording a queuing latency as a duration between said first time and said second time.

Preferably, said request is an HTTP request.

Preferably, said estimating the client-latency further comprises adding said recorded queuing latency to said initial client latency estimate, thereby to provide a revised client latency estimation.

Preferably, the method comprises estimating a transmission-data-rate comprising dividing an amount of data the server sends in the course of a given transmission, by said client latency estimate for said given transmission, and subtracting the round trip time, thereby to estimate a transmission data rate.

Preferably, the method comprises estimating an overall-client-data-rate including averaging together a plurality of successively measured transmission data rates for the given client connection.

Preferably, the method comprises estimating a client-data-reception-time including:
multiplying an amount of data left to send by said overall data rate, and
adding thereto a time at which the server dispatches an end of data indication to the client,
thereby to provide an approximation of a time at which the client receives a last part of the data being sent.

Preferably, estimating the user client latency comprises:
subtracting the time the server received an initial request for data from the client from said time the client received the last of the data,
adding one and a half times the estimated round trip time, and
adding the recorded queuing latency, thereby to estimate the client latency.

Preferably, the method comprises estimating a client-connection-data-rate including:
identifying ones of transmissions for a respective client connection, being larger than a predetermined size,
averaging together respective transmission data rates of said identified transmissions, thereby to provide an approximation of the data rate for a given client connection.

Preferably, the method comprises estimating a client-data-reception-time including:
multiplying the amount of data remaining to send by said data rate for a given client connection, and
adding thereto a time at which the server dispatched the last data part of the requested data to the client,
thereby to provide an approximation of a time the client received the last of the requested data.

Preferably, the method comprises:
subtracting the time at which the server received an initial request for data from a client from said time at which the client received the last of the requested data,
adding thereto one and a half times the estimated round trip time, and
adding the queuing latency thereto,
thereby to provide an approximation of the client latency.

Preferably, the method comprises estimating a global-transmission-rate including estimating a global transmission data rate, by averaging together transmission rates.

Preferably, the method comprises estimating a client-data-reception-time including:
multiplying the amount of data left to send by said global transmission data rate, adding thereto the time of server dispatch of the last data to the client, thereby to provide an approximation of a time at which the client received the last of the requested data.

Preferably, the method comprises:

subtracting the time the server received an initial request for data from a client from said time the client received the last of the requested data, adding thereto one and a half times the estimated round trip time, and adding thereto the queuing latency, thereby to provide an estimation of the client latency.

Preferably, the method comprises estimating a global-transmission-rate comprising:

identifying ones of a plurality of transmissions exceeding a predetermined threshold size, and averaging together transmission rates of said identified transmissions, thereby to estimates a global transmission data rate.

Preferably, the method comprises estimating a client-data-reception-time comprising:

multiplying the amount of data left to send by said global transmission data rate, adding thereto the time the server wrote the last data to the client, thereby to estimate the time the client received the last of the requested data.

Preferably, the method comprises:

subtracting the time the server received an initial request for data from a client from said time the client received the last of the requested data, adding one and a half times the estimated round trip time, and adding thereto the recorded queuing latency, thereby to estimate the client latency.

Preferably, each said client communicates via at least one channel, the method further comprising estimating a channel-data-rate including:

dividing an amount of data the server sends, by an approximation of the client latency measured for said channel, and subtracting therefrom the round trip time, thereby to provide an approximation of the data rate for a given channel.

Preferably, each client communicates via a plurality of channels, the method further comprising estimating an overall-client-data-rate including:

providing data rates for each one of said plurality of channels, averaging together said plurality of data rates from said plurality of channels, thereby to estimate an approximation of a data rate for a given client.

Preferably, the method comprises estimating a global-data-rate including:

providing data rates for a plurality of clients each communicating over a plurality of channels, and averaging together a plurality of successively measured data rates thereby to estimate the global data rate.

Preferably, the method comprises estimating a transmission-packet-rate including:

obtaining a number of packets being sent by a server in the course of a transmission, dividing said number of packets by said first client latency estimate, subtracting therefrom the estimated round trip time, thereby to estimate a transmission packet rate for said transmission.

Preferably, the method comprises estimating an overall-client-packet-rate including:

obtaining a plurality of said transmission packet rates over a plurality of transmissions for a given client connection, averaging together said plurality of transmission packet rates, thereby to provide an estimate of an overall client connection packet rate.

Preferably, the method comprises estimating a client-data-reception-time including:

multiplying the number of packets left to send by said overall packet rate, adding thereto the time the server wrote the end of the data to the client, thereby to provide an approximation of a time at which the client received the last of the requested data.

Preferably, the estimating the client-latency comprises:

subtracting the time the server received an initial request for data from said client from said time the client received the last of the requested data, adding thereto one and a half times the estimated round trip time, and adding thereto the recorded queuing latency, thereby to provide an approximation of the client latency.

Preferably, the method comprises estimating a client-connection-packet-rate including:

obtaining a plurality of transmission packet rates for a given connection, identifying ones of said plurality of transmission packet rates whose respective transmissions exceed a predetermined size threshold, and averaging together said identified transmission packet rates, thereby to provide a client connection packet rate approximation.

Preferably, the method comprises estimating a client-data-reception-time including:

multiplying the number of packets left to send by said client connection packet rate approximation, and adding thereto the time the server dispatched the last of the requested data to the client, thereby to provide an estimate of a time the client received the last of the requested data.

Preferably, the method comprises:

subtracting the time the server received an initial request for data from a client from said time the client received the last of the requested data, adding thereto one and a half times the estimated round trip time, and adding thereto the recorded queuing latency, thereby to estimate the client latency.

Preferably, the method comprises estimating a global-transmission-rate including:

obtaining a plurality of transmission packet rates, and averaging together said plurality of transmission packet rates, thereby to estimate a global transmission packet rate.

Preferably, the method comprises estimating a client-data-reception-time including:

multiplying the number of packets left to send by said global transmission packet rate, adding thereto the time the server wrote the last data to the channel, thereby to provide an approximation of a time at which the client received the last of the requested data.

Preferably, the method comprises:

subtracting the time the server received an initial request for data from a client from said approximation of the time at which the client received the last of the requested data, adding thereto one and a half times the estimated round trip time, and adding the queuing latency, thereby to provide an approximation of the client latency.

Preferably, the method estimating comprises a global-transmission-rate including:

obtaining a plurality of transmission rates for each of a plurality of data transmissions, identifying ones of said plurality of transmission rates whose respective transmissions exceed a predetermined size threshold, and averaging together said identified transmission rates to form an approximation of a global transmission packet rate.

Preferably, the method comprises estimating a client-data-reception-time including:

multiplying the number of packets left to send by said approximation of said global transmission packet rate, and adding thereto the time the server wrote the last data to the channel, thereby to provide an estimate of the time the client received the last of the requested data.

Preferably, the method comprises:

subtracting the time the server received an initial request for data from a client from said estimate of the time the client received the last of the requested data, adding thereto one and a half times the estimated round trip time, and adding thereto the recorded queuing latency, thereby to provide an approximation of said client latency.

Preferably, the method comprises estimating a channel-packet-rate wherein said client communicates using at least one channel, the method including:

obtaining a client latency approximation for said channel, dividing the number of packets the server is sending over the channel by the client latency approximation for said channel, subtracting therefrom the round trip time, thereby to provide an approximation of a packet rate for a given channel.

Preferably, the client has at least one additional channel, in which case the method may further comprise:

obtaining an approximation of a packet rate for each of said channels, averaging together said packet rates, thereby to estimate a packet rate for said client.

Preferably, the method comprises estimating a global-packet-rate including: obtaining a plurality of packet rates for each one of a plurality of clients, and averaging together said packet rates to provide an approximation of a global packet rate.

Preferably, the method comprises logging HTTP transmissions.

According to a third aspect of the present invention there is provided a data carrier carrying data usable in combination with a general purpose computer to provide functionality capable of estimating the latency between when a client sends a request for data to a server, and when that client receives the data, using measurements made at a server. The data carrier comprises an event observer for observing pre-selected events associated with said communication occurring at said server. A logging device associated with said event observer logs into a data store the occurrence of said events together with respective time information. And a latency estimator associated with said logging device uses said logged occurrences with said respective time information to arrive at an estimation of latency in said communication.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 3 is a simplified schematic diagram of a client establishing a connection with a server, and downloading a web page from that server, using multiple (in this case, two) persistent connections (channels).

FIG. 5A is a simplified diagram showing some of the log files that may be kept by a typical server, while

DESCRIPTION OF THE PREFERRED EMBODIMENTS

Figure 1:
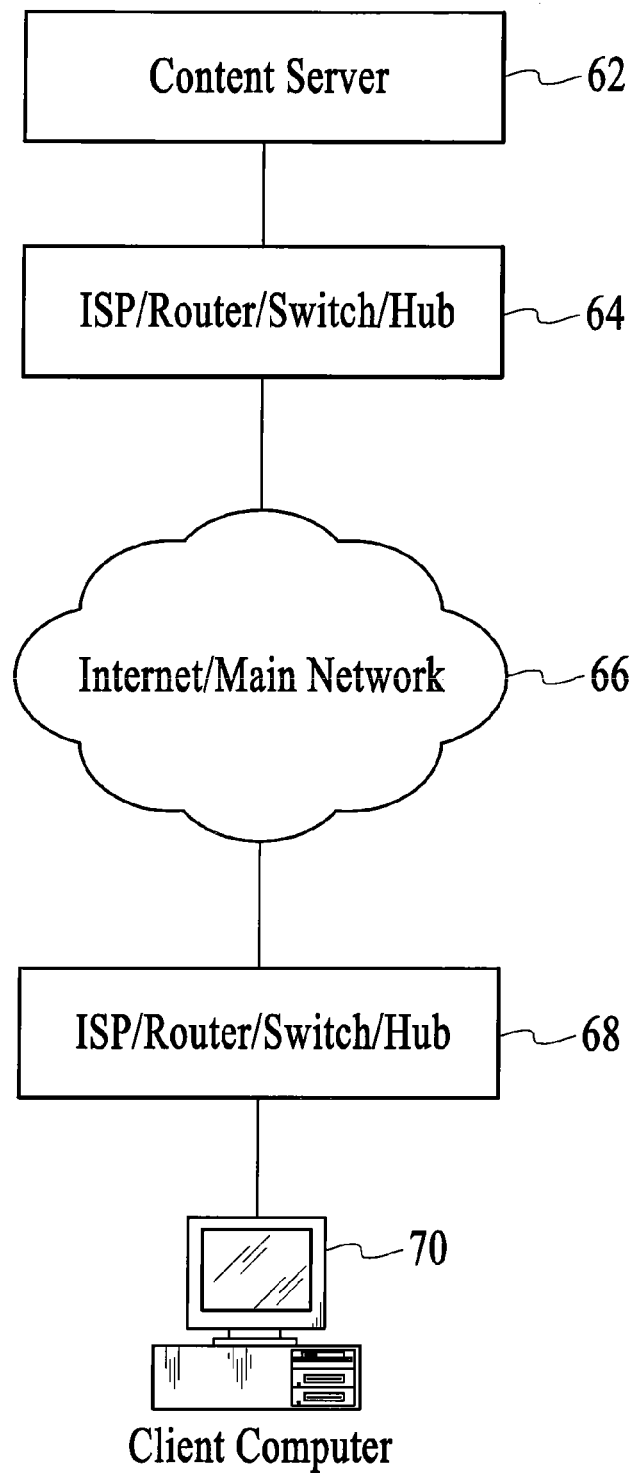
FIG. 1 is a simplified schematic of the structure of the Internet, or other like network.

The present invention allows a client's latency, that is, the amount of time between a first time, when a client makes an initial request for data, and a second time when the client receives the requested data, to be estimated in association with a server serving data to the requesting client. The client's latency may be estimated using calculations, based on measurements made in association with the server.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1, which is a simplified schematic diagram of the connection between a client and a server using the Internet, or other like network. A content server 62 is connected to at least one Internet Service Provider (an ISP), router, switch or hub or a plurality thereof 64. The ISP, router, switch, or hub, is connected to the Internet or main network 66, which may consist of a series of other routers, hubs, switches, other network connection, and various nodes with information about the network topologies, as well as other connection devices, including various data pipes, such as Ethernet cable, fiber-optic cable, telephone lines, and satellite connections. Connected to the Internet, or other network is a client's ISP, router, switch, or hub 68. In the general case, the client's ISP, router, switch or hub may or may not be the same as the content server's ISP router, switch or hub, but often will not be. The client 70 is in turn connected to the client's ISP, router, switch or hub.

In general, for data to travel from one computer to another over a network, or through the Internet, that data may travel through a number of intermediaries, before that data gets to its destination. For a client to send data to a server the data may pass through the client's ISP, router, switch or hub 68, through the Internet, or various routers switches and hubs 66, through the server's ISP, router, switch or hub 64, and finally arrive at the server 62. Similarly, for data to travel from the server to the client the data may pass through the server's ISP, router, switch or hub 64, through the Internet, or various routers switches and hubs 66, through the client's ISP, router, switch or hub 68, and finally arrive at the client 70. For data to pass from a client to a server, or from a server to a client, there may be delay in any of these steps. The connection between the client and the server may have limited bandwidth, and only a certain amount of data may be able to travel from a client to a server in a given period of time. Similarly, there may be a limited bandwidth between a server and a client, which may or may not be the same as the bandwidth from the client to the server (the client's upload bandwidth, and download bandwidth, respectively). There is also a delay due to the various stops along the way from the client to the server, and from the server to the client, that is, it takes a certain amount of time for any data to travel through the network, from the client to the server, or from the server to the client, regardless of the bandwidth. Both these elements of delay may have a part in determining the client's latency.

Figure 2:
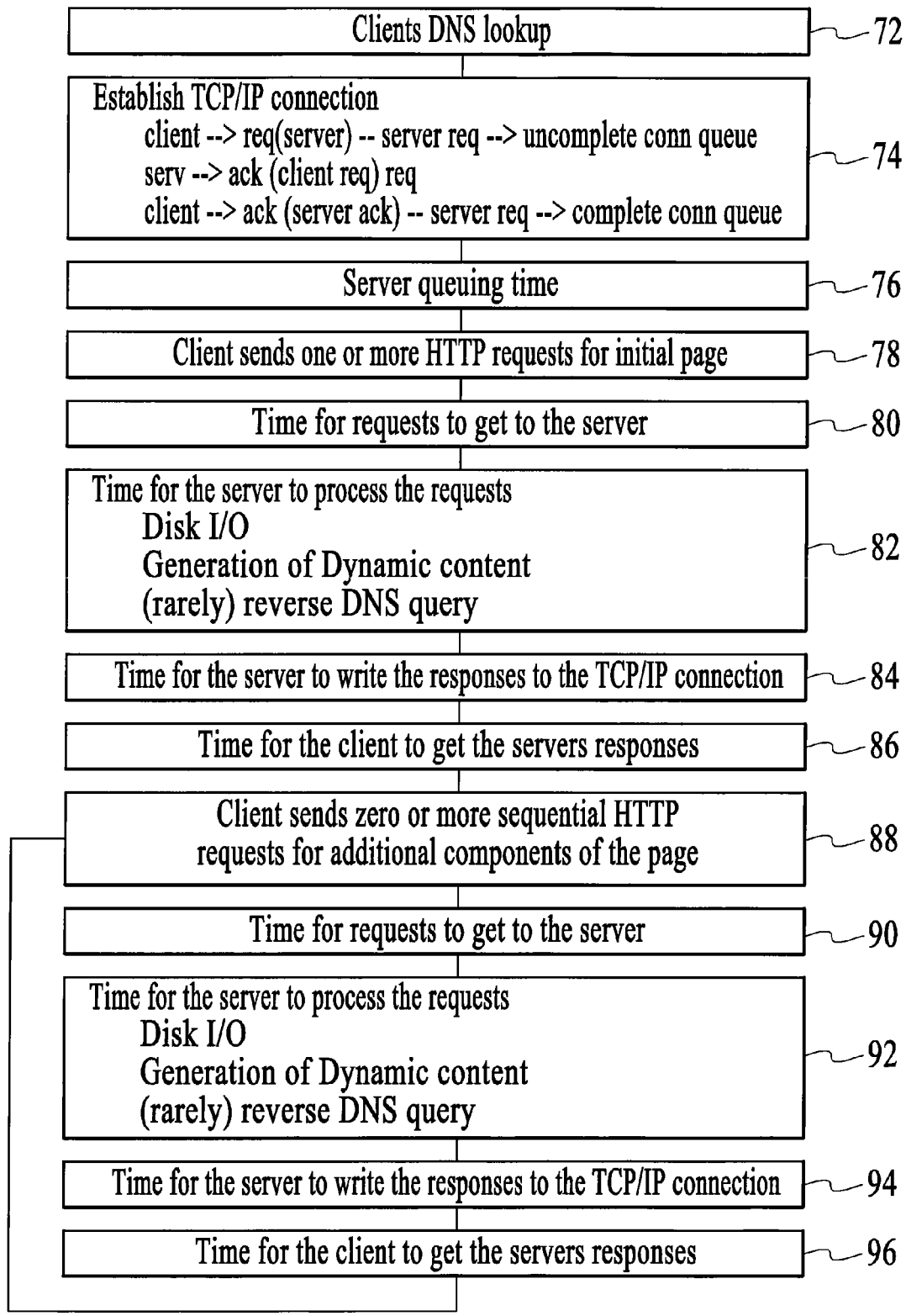
FIG. 2 is a simplified diagram showing some of the elements of the latency a client may experience in downloading content from a server.

Reference is now made to FIG. 2 which is a simplified flow chart showing a typical web-page download procedure, and illustrating sources of latency for a download. For simplicity, when a client sends data to a server it is referred to as a request, and when the server sends data to a client it is referred to as a response. The sum total of all exchanges that occur between a client and a server, in the client's downloading of a single web page is referred to as a web-page transaction. In order to initiate a connection with a server, a client may make a DNS lookup in order to contact a server 72. In a DNS lookup, a client sends a request to a known server (a DNS server) requesting the address of a target server (the server the client is trying to initiate a connection with). The DNS server either has the address of the server the client is looking for, or has to look up the address with another server. If the other server does not have the address it may consult a different server, which may in turn have to consult a further server, until finally a server finds the requested address, or determines that there is no server with such an address. In general, DNS lookup is a small art of the web page transaction. Assuming that the DNS server finds the address, the DNS server eventually responds to the client with the address of the target server.

Once the client has ascertained the address of the target server, the client may establish a connection with the target server. Using the HTTP 1.1 protocol, the client may establish persistent connections, referred to as channels, with the target server 74. A channel is a connection that is used for multiple requests and responses, as opposed to opening a new connection for each request. The establishment of a connection takes a certain amount of time, referred to as connection latency. A client may open multiple channels with a server. Each of these channels may be opened at a different time, or may be opened simultaneously. When channels are opened simultaneously, the connection latencies, for each channel, may overlap. Using TCP/IP, establishing a connection is initiated by the client sending a request to the server. The server places the request on an uncompleted connection queue and sends an acknowledgment of the request back to the client. Upon receiving the server's acknowledgment of the initial request, the client sends a request to the server acknowledging the server's acknowledgment of the initial request. When the server receives the client's acknowledgment of the server's acknowledgment the server moves the request onto a completed connection queue 76. Normally the request does not stay in the completed connection queue for long, but if the server receives many requests at the same time, or within a short period of time, then a request may sit in the completed connections queue for some time. The time the connection remains in the server's completed connection queue is referred to as the queuing latency. The connection queue has a maximum length, and if that length is reached, then the client connection is dropped, and the channel is not established. Assuming the server does not drop the connection, the server accepts the connection. The client sends one or more requests to the server for an initial HTML page 78, called the main page. Note that this request may have been sent while the server accepts the connection, that is to say, the first request on the channel may be sent as soon as the client receives the server's initial acknowledgment of the client's connection request. Once the server accepts the connection, the server may read the request sent by the client, for the main page. There may be delay between when the request for the main page was sent, until the server receives the request for the main page 80. However, if the queuing latency is greater than the time it takes for the client to send the request, then the time for the client to send the request does not factor in to the time the client has to wait. Upon receiving the request for the main page, the server processes the request, which may consist of disk time such as finding static HTML, processing time, such as generating dynamic content, and possibly a reverse DNS lookup 82 (the server looking up the client's address). It takes time for the server to write the response to the request for the main page to the channel 84, and then it takes time for the client to receive the main page (the time it takes the response to travel from the server to the client) 86. The main page may indicate that there are other components of the page for the client to download, in which case the client may send one or more additional requests to the server for those components 88. Note that the client may send requests for additional components before the client has finished downloading the main page. When the client starts parsing the main page, the client may find a reference to an additional component of the web page, and upon recognizing the reference, the client may send a request for that component, before the client has finished downloading the entire main page. When there are additional components, the client may have to wait until the server receives requests 90 for those components, following which, the server processes those requests 92, and writes one or more responses to the additional requests 94. The client then waits for the additional responses to travel from the server to the client 96. Depending on what was in the main page, and what was in the responses to the additional requests, the client may request additional content 88. Once the client has received all the responses, the web page transaction is complete, and the client has the entire web page.

Reference is now made to FIG. 3, which is a simplified schematic timing diagram showing delays involved when a client establishes a connection with a server, and downloads a web page from that server, using multiple (in this case, two) channels. The client sends the server requests, to open a first 240, and a second 264, channel. Theses two requests may be sent simultaneously, or one closely following the other. The server receives the requests from the client 242, and 266, and places the requests in the uncompleted connection queue. The server sends out acknowledgments of the client's connection requests. The client receives the acknowledgments 244, and 268, and sends acknowledgments of the acknowledgements to the server, 246, and 270. The client sends the server a request for the HTML 247, namely the main page, on the first channel 240. The server receives the acknowledgments of the server's acknowledgment 246, and 270 and places the connections on the completed connection queue 247, and 270. The establishment of a connection comprises a 3-way handshake (1. client request, 2. server acknowledgement, 3. client acknowledgment of server acknowledgment), and the server's queuing time. The time it takes to establish a connection is referred to as the connection latency. It is noted that each channel may have connection latency, and that the connection latencies of each channel may overlap. The server accepts the connections 247, and 270, and reads the request on the first channel 240. The server processes the request, and writes a response to the client 250. The client starts receiving the response (the main page) on the first channel 240. When the client detects 274 a reference to a first component of the main page, such as an image, a JavaScript, a java applet, a flash object, or any other object referenced by the main page, even if the client has not finished receiving the entire HTML portion of the web page, the client may send the server a request for the referenced object on the second channel 276. The server receives the request for the component 276, and may start processing the request. The server processes the request for the first component, and starts sending the client the first component 280 on the second channel. Meanwhile the client may have finished receiving the entire HTML (the client may have received the main page), may have parsed the entire HTML, of the main page, and may send a request, for a second component referenced by the HTML, on the first channel 256. The server receives the request for the second component on the first channel 256. The server processes the request for the second component and sends a response to the request for the second component 260 on the first channel. The client receives the first component on the second channel 282, and the client receives the second component, on the first channel 262. If there is only the HTML, and two components referenced by the HTML, the client will have finished downloading the page. Otherwise the client will continue sending requests to the server on as many channels as the client has, until the client has all the components of the page referenced by the HTML.

To compute the total time the client has had to wait, from the time the client sends the request for information, until the client has received the entire page, one needs to know when the client sent out the initial request, and when the client received the final response. The goal is to obtain as accurately as possible, such times for each client, and to obtain such information based entirely on server based measurements.

There are several latencies associated with a client's download that a server's administrator might be interested in determining. One such latency is the main page latency, the time between the client sending a request for a web page, and receiving the HTML portion of the web page, namely the main page. Another such latency, the web page latency, is the time between the client initially requesting the web page, and receiving the entire web page, along with all referenced components, such as images, sound files, Java Scripts, Java applets, or any other component of the web page.

In order to determine various latencies, it may be useful to determine a round trip time. The round trip time is defined as the time it takes for a theoretically infinitely small piece of data to go from a server to a client and return to the server.

An estimation of the main page latency may be provided by:

$$\text{Main page latency} \approx T_{DNS\ Lookup} + 1.5 \times RTT + \quad \text{(eq. 1)}$$
$$T_{Queuing} + T_{Server\ processing\ time} + 0.5 \times RTT + \frac{\text{HTML}_{Size}}{\text{Bandwidth}}$$

where:

$T_{DNS\ Lookup}$ is the time the client takes for a DNS lookup,
RTT is the round trip time,
$T_{Queuing}$ is the queuing latency
$T_{server\ processing\ time}$ is the time it takes the server to process the request
$\text{HTML}_{size}$ is the size of the HTML being sent, and
Bandwidth is the bandwidth from the server to the client.

An estimation of the web page latency may be provided by:

Response Size, $$\text{Web page latency} \approx T_{DNS\ Lookup} + 1.5 \times RTT + \quad \text{(eq. 2)}$$
$$T_{Queuing} + \max_{1 \le i \le N} \left\{ E_i + 0.5 \times RTT + \frac{\text{Response Size}_i}{\text{bandwidth}} - S_1 \right\}$$

where:

$T_{DNS\ Lookup}$ is the time the client takes for a DNS lookup,
RTT is the round trip time,
$T_{Queuing}$ is the queuing latency
N is the number of HTTP responses the server writes to send the client the web page, $E_i$ is the time at which a particular response, response i is written to the channel, and $S_1$ is the time the server received the first HTTP request from the client.

Both the above estimations are dependent on knowing the bandwidth from a server to a client. An estimation of bandwidth may be provided by the equation:

$$bw = \text{Response Size}_i / (t_{server\_recv_{i+1}} - t_{serv\_send_i} - RTT) \quad \text{(eq. 3)}$$

where:

bw is the bandwidth,

Response Size$_i$ is the size of the response whose transmission bandwidth is being determined, $t_{server\_recv_{i+1}}$ is the time the server received a first request consequent to the response of Response Size$_i$, $t_{serv\_send_i}$ is the time the server sent the response of Response Size$_i$, and RTT is the round trip time.

Equation 3 depends on an accurate knowledge of the round-trip-time, for the given transmission. Merely using an average round trip time the above estimation could estimate, for certain transmissions an almost infinite bandwidth, or a negative bandwidth.

Using the available bandwidth may not give as accurate a measurement as possible, as the actual bandwidth used may vary greatly, because of dropped TCP packets that must be re-transmitted, because of network congestion, because the server is overloaded, because the client is overloaded, or for a wide variety of other possible reasons. Other means of estimating the client's latency are therefore presented.

Figure 4:
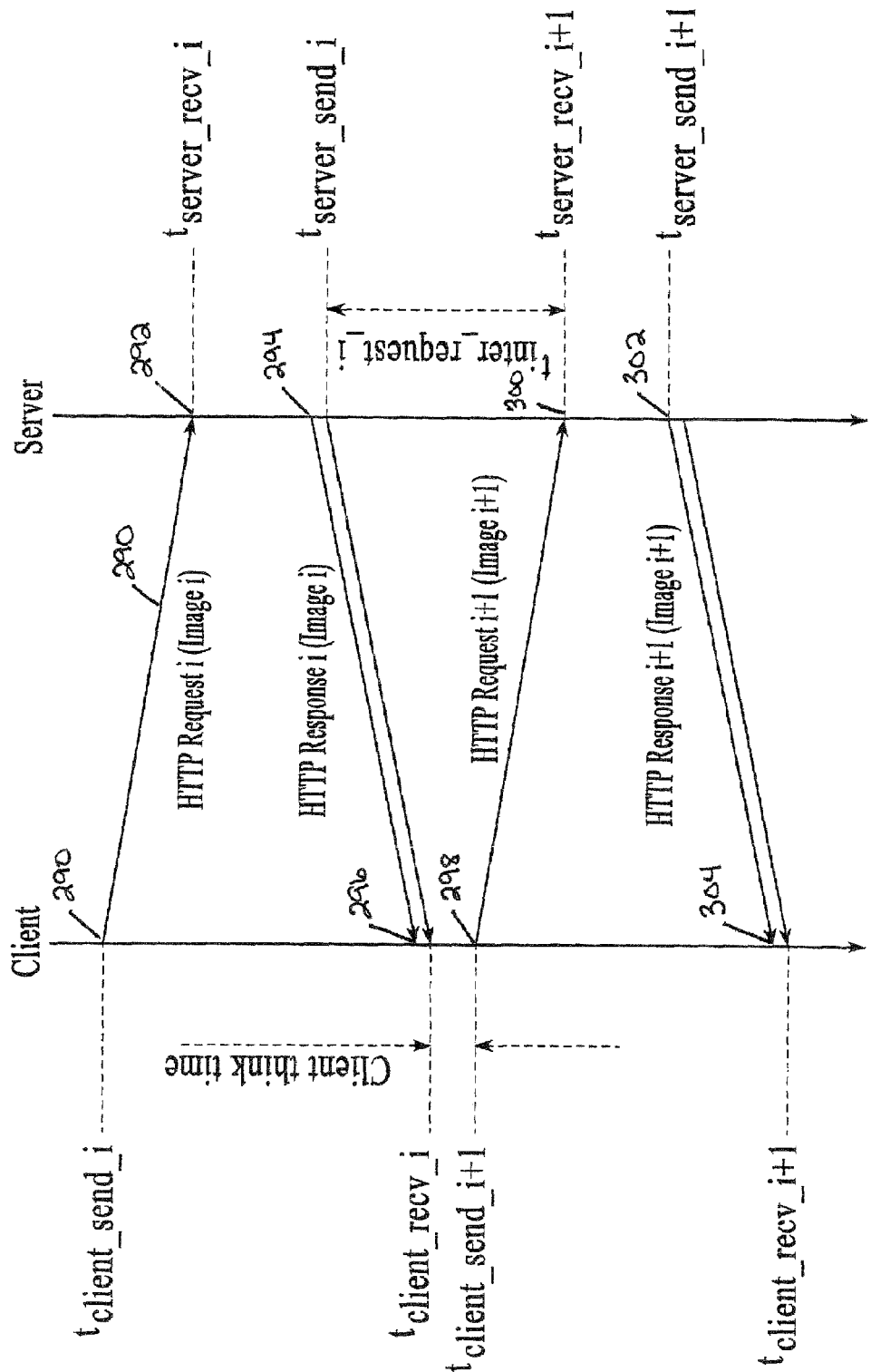
FIG. 4 is a simplified schematic diagram of a single channel between a client and a server, showing a relationship between the times the client requests different components of a Web-page on the channel.

Reference is now made to FIG. 4, which is a simplified schematic timing diagram of a single channel between a client and a server, showing a relationship between the times the client requests different web-page components on a channel. FIG. 4 illustrates some of the dependence between a server's response, and a client's sending a request, subsequent to the server's response, on the channel.

In FIG. 4, the client sends a request, request$_i$ for a component i, of a page, for instance, a web page, to the server 290, at time $t_{client\_send\_i}$. Request$_i$ arrives at the server 292, at time, $t_{server\_recv\_i}$, which is after $t_{client\_send\_i}$. The server processes request$_i$ and sends a response, response$_i$ 294 to request$_i$, at time $t_{server\_send\_i}$. Response$_i$ is received at the client 296 at time $t_{client\_recv\_i}$. The client processes response$_i$ and then may send a subsequent request, 298, request$_{i+1}$ for another component, i+1, at time $t_{client\_send\_i+1}$. The server receives request$_{i+1}$ at time $t_{server\_recv\_i+1}$ 300, processes request$_{i+1}$, and sends a response, response$_{i+1}$ 302 to request$_{i+1}$, at time $t_{server\_send\_i+1}$. The client then receives response$_{i+1}$ 304, at time $t_{client\_recv\_i+1}$. It is observed that there is a dependency between $t_{server\_send\_i}$ and $t_{server\_recv\_i+1}$. For example, if a client has 2 channels, A and B, the client may send a request on B for an additional component, while the client is downloading a component on A, but the client will not send a request, on channel A, until that client has finished downloading a component on channel A. The time between the server sending a response to a request (response$_i$) and the server receiving a subsequent request (request$_{i+1}$) on the same channel is called the inter-request-time. The inter-request time may help determine the bandwidth of a client connection, as well as helping to determine the client's round trip time, as will be described below.

Figure 5A:
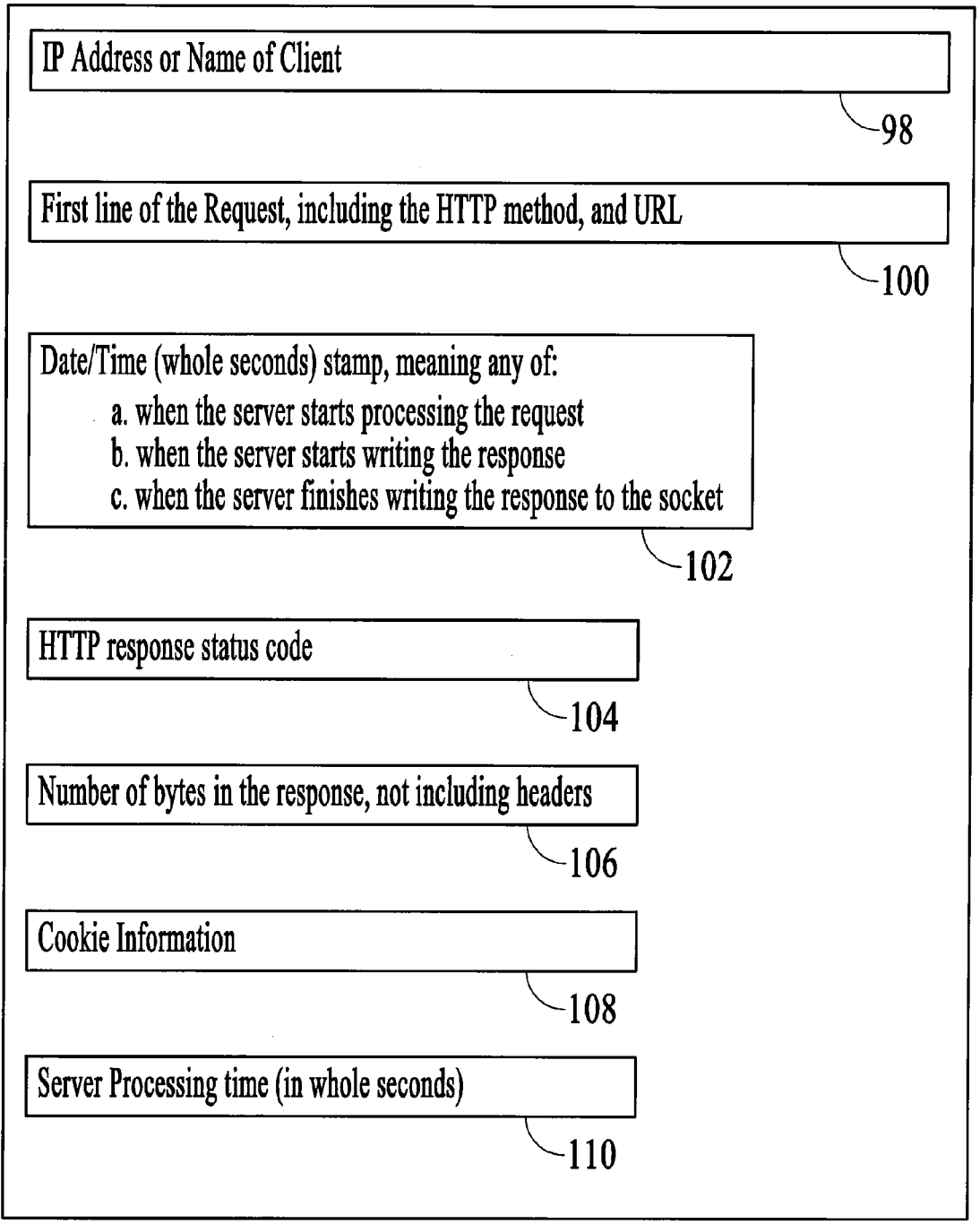

Reference is now made to FIG. 5A, which shows some of the log files a server may record. A server may typically record, in a first log 98, the IP addresses, names or other identification information of clients connecting thereto. A server may also record a second log 100 of a first line of the client's request, including the HTTP method and the URL requested. The server may record a third log 102 of a date/time stamp, which, depending on the server, can hold a representation of the time the server starts processing the request or the time when the server started writing a response. The server may record a fourth log 104 of the HTTP response status code, and a fifth log 106, of the number of bytes in the response, not including headers. Servers may optionally record a sixth log 108 of information about cookies stored on the client, and a seventh log 110, of the server's processing time.

Figure 5B:
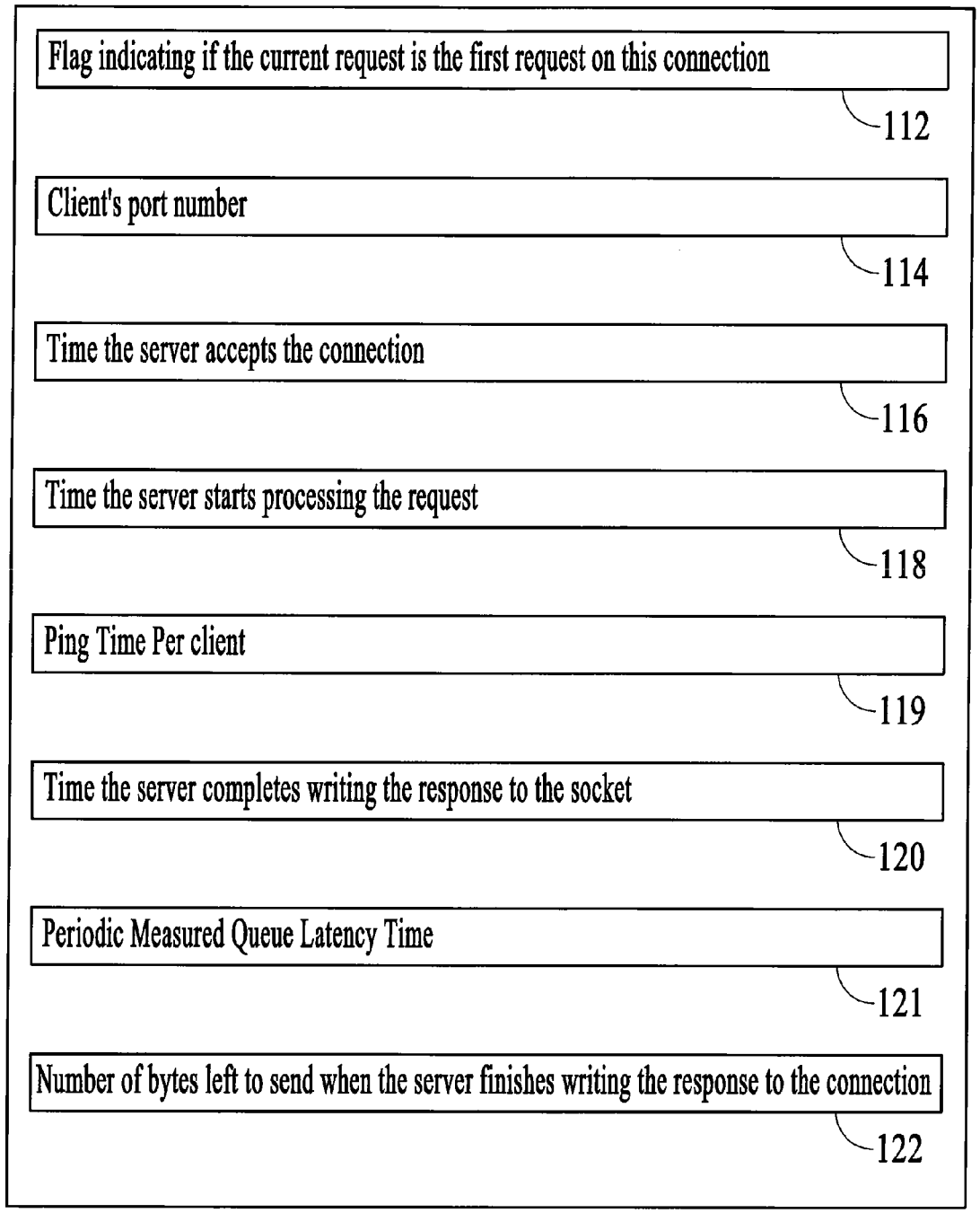
FIG. 5B shows additional logs that a server associated with an apparatus according to a first preferred embodiment of the present invention, may keep.

Reference is now made to FIG. 5B, which shows additional logs that may be recorded by a server using a server side latency estimator, according to preferred embodiments of the present invention. The logs may be recorded by the logging mechanism already on the server, or may be recorded independently. The server records a first additional log, for each channel, of the time the server accepts the channel connection 116. For each request the client sends on each channel, the server, preferably, additionally records:

a first request log 112, which comprises a flag which indicates if the request is the first request on a given channel, a second request log 114 comprising the client's port number, a third request log 118 comprising the time the server starts processing the request, a fourth request log 120 comprising the time the server completes writing a response to the channel, and a fifth request log 122, comprising the number of bytes left to send when the server logs the request, that is, the number of bytes left to send when the server completes writing the response to the channel, and records the fifth request log.

Preferably, for each web transaction, the server also logs a client's ping time 119. Preferably, at pre-defined intervals, the server additionally logs a queuing latency, 121, as recorded by a queuing latency probe, which is described below. Preferably, the log includes a timestamp, showing the time the latency was recorded.

Figure 6:
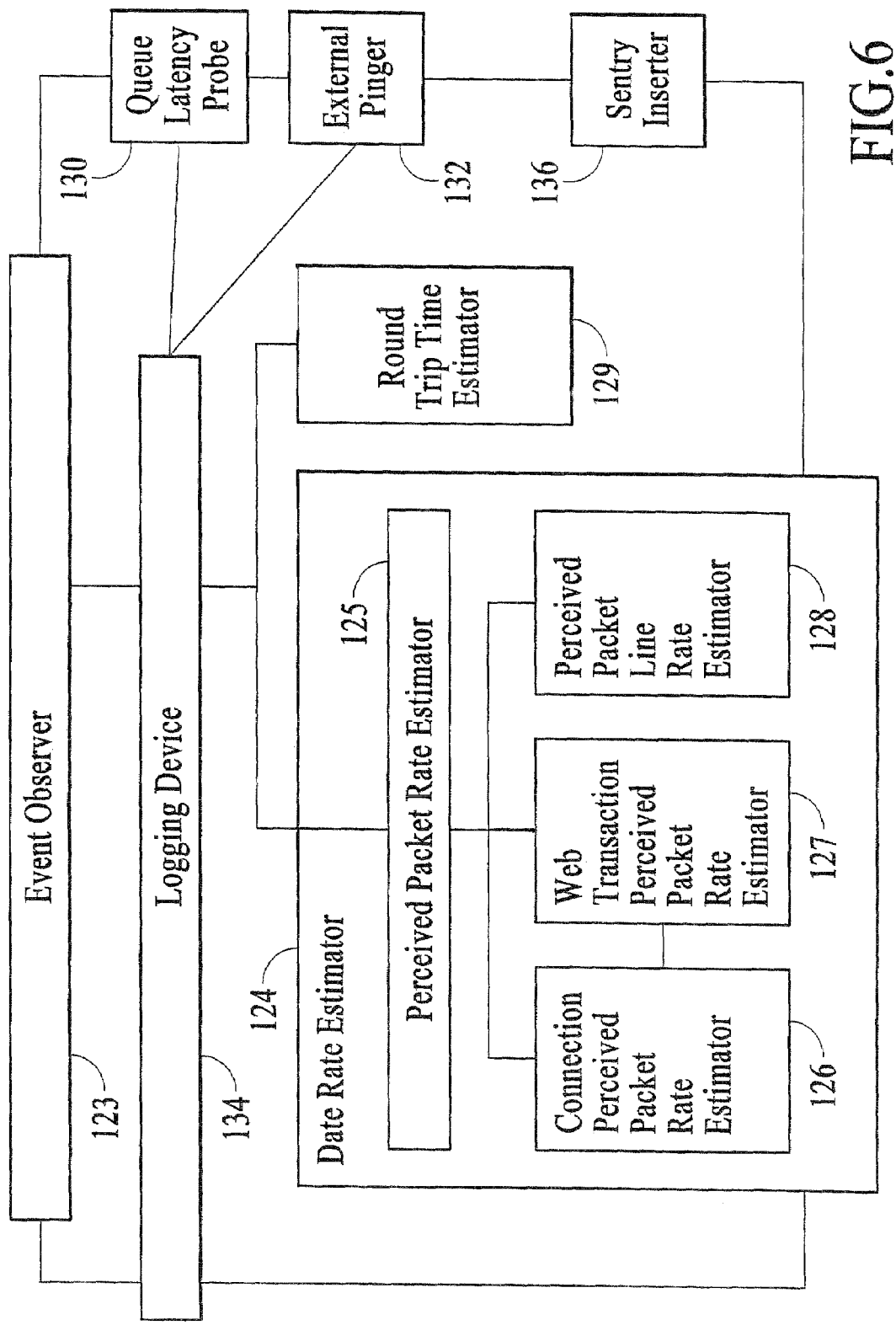
FIG. 6 is a simplified block diagram showing an apparatus according to a first preferred embodiment of the present invention.

Reference is now made to FIG. 6, which is a simplified block diagram of a server side latency estimator, operative in accordance with a first preferred embodiment of the present invention. The server side latency estimator is associated with a server, for example a web server. The server side latency estimator comprises an event observer 123, which is operable to observe various pre-defined events happening at, or about, the server the device is associated with. The event observer is connected to a logging device 134, which is operable to log events, and time information relating to those events, such as when events occur, or a time duration between related events. The server side latency estimator may use the server's logging device, or the server side latency estimator may have its own, separate, logging device. The server side latency estimator may record logs, with the logging device, as described in FIGS. 5A and 5B. The server side latency estimator also comprises the queuing latency probe 130, referred to above, which may be connected to the logging device 134. The queuing latency probe preferably sends a small request to the server using a new connection, such as a new TCP connection, at pre-specified intervals. The queuing latency probe measures the time it takes for a server to accept the new connection, that time corresponding to the so-called queuing latency. It will be noted that when the new request is sent from and to the same server, or from a computer close to the server, to the server, the time for the 3-way handshake will be minimal, and the queuing time will be dominant, as the connection between the probe and the server is likely to have high bandwidth, and a small round trip time. Over a short period of time the queuing latencies are approximately the same for all requests, as the queuing time is primarily dependent on the server's conditions, namely how many requests the server is handling at a given time. The queuing latency probe measures the time it takes for the server to accept new requests, and the logging device may keep a log of time information regarding the server's responses as described above. The queuing latency estimator may also alert a server's administrator if the queuing latency estimator finds that its requests are being dropped.

An external pinger 132 is connected to the logging device, and preferably sends out a ping, or ping like communication, to each client connecting to the server. Sending out a ping to each client may be accomplished in a number of ways. In a preferred embodiment the external pinger runs in parallel to the web server and at low rate reads the access log. For each new client IP address appearing in the access log the external pinger sends a single ping and waits for the response. It is noted that because the pinger uses a single ping measurement and that the ping measurement may take place some time after the actual web page transaction, the measurement may not be completely accurate, but the ping measurement still serves as a good approximation of the actual round trip time. The external pinger has minimal processing and communication overhead. The external pinger may also be used to identify routing problems, by pinging a list of frequent hosts/subnets, at low rate, and reporting any problems to a server's administrator.

In a variation it is possible to arrange the external pinger to ping the client upon the client's initial establishment of each channel. The connection procedure is preferably modified such that on each connection establishment an interrupt is sent to the external pinger, which then pings the client. This has the advantage of giving a more accurate ping time. Also the external pinger does not then have to read the log. However the variation increases system overhead.

The logging device 134 preferably records a log of all the measured ping times for each client, that is, the log records time information relating to the duration between the external pinger pinging the client, and receiving the client's response.

Preferably there is a sentry inserter 136, a device that may modify data being sent to include a prompt for the client to make an additional request at the end of the client's reception of the data, the prompt for the additional request hereafter referred to as a sentry 136. The sentry preferably causes the client to make an additional request at the end of data receipt, the additional request thus serving as an indicator that all of the data has been received. In the first preferred embodiment, the sentry simply comprises an additional image tag, located at the end of the HTML, for an image that has no contents and may be one pixel. The request prompted by the sentry determines a latest time when the client finishes receiving the main page. The sentry may be used to provide an initial estimation for the main page latency, and, in certain cases, for example, when the web page has a large amount of HTML, and few, small images, the web page latency. In addition the sentry may generate two sequentially dependent requests which enable the rate estimator to make an estimation of the bandwidth and the round trip time, as will be described below. It is noted that the sentry has a negligible overhead on the server, the client, and the communication network.

When the client receives the sentry, the client preferably makes the additional request to the server. As mentioned, the image is only one pixel at the end of the page, and therefore the client is preferably able to render the page. The request generated by the client as a result of the sentry may thus serve to help determine when the client receives the last of the data, that is when the client finishes downloading the web page.

Generally speaking, the purpose of the sentry is to provide a better main page latency estimator, but it provides better web-page latency estimation. If the client is using pipelining and the last image sent [not including the sentry] is large, it will finish after the client receives the sentry. Hence, in such a case, the time the client receives the sentry does not mean that the client received all the web page.

The server side latency estimator preferably has a round trip time estimator 129 associated with the logging device 134, for estimating round trip times. The server side latency estimator preferably has a data rate estimator 124, connected to the logging device, which is composed of:

a perceived packet rate estimator 125, connected to the logging device 134, a connection perceived packet rate estimator 126, connected to the connection perceived packet rate estimator 125, a web transaction perceived packet rate estimator 127, connected to the perceived packet rate estimator 125, and a perceived packet line rate estimator 128, connected to the perceived packet rate estimator 125.

The perceived packet rate estimator 125 may be used to estimate a perceived packet rate, $Rate_{inter\text{-}request}$, for each transmission.

The connection perceived packet rate estimator 126 may estimate a connection perceived packet rate, $Rate_{conn}$, which is a packet rate for each client connection, preferably based on individual channels to individual clients. Each new download of a new web page is treated separately, so that for each download the client preferably receives one ping. The packet rate is preferably based on all the estimated packet rates per transmission for each respective client.

The web transaction perceived packet rate estimator 127 may estimate a web transaction perceived packet rate, $Rate_{Web\text{-}Trans}$, which is taken to be the average packet rate of all connection rates $Rate_{Conn}$ to a particular client. The perceived packet line rate estimator 128 may estimate a perceived packet line rate, $Rate_{line}$, which is an average packet rate per client, based on all the estimated packet rates per transmission estimated for each respective client, wherein those packet rates fall within specific size criteria as discussed below.

Figure 7:
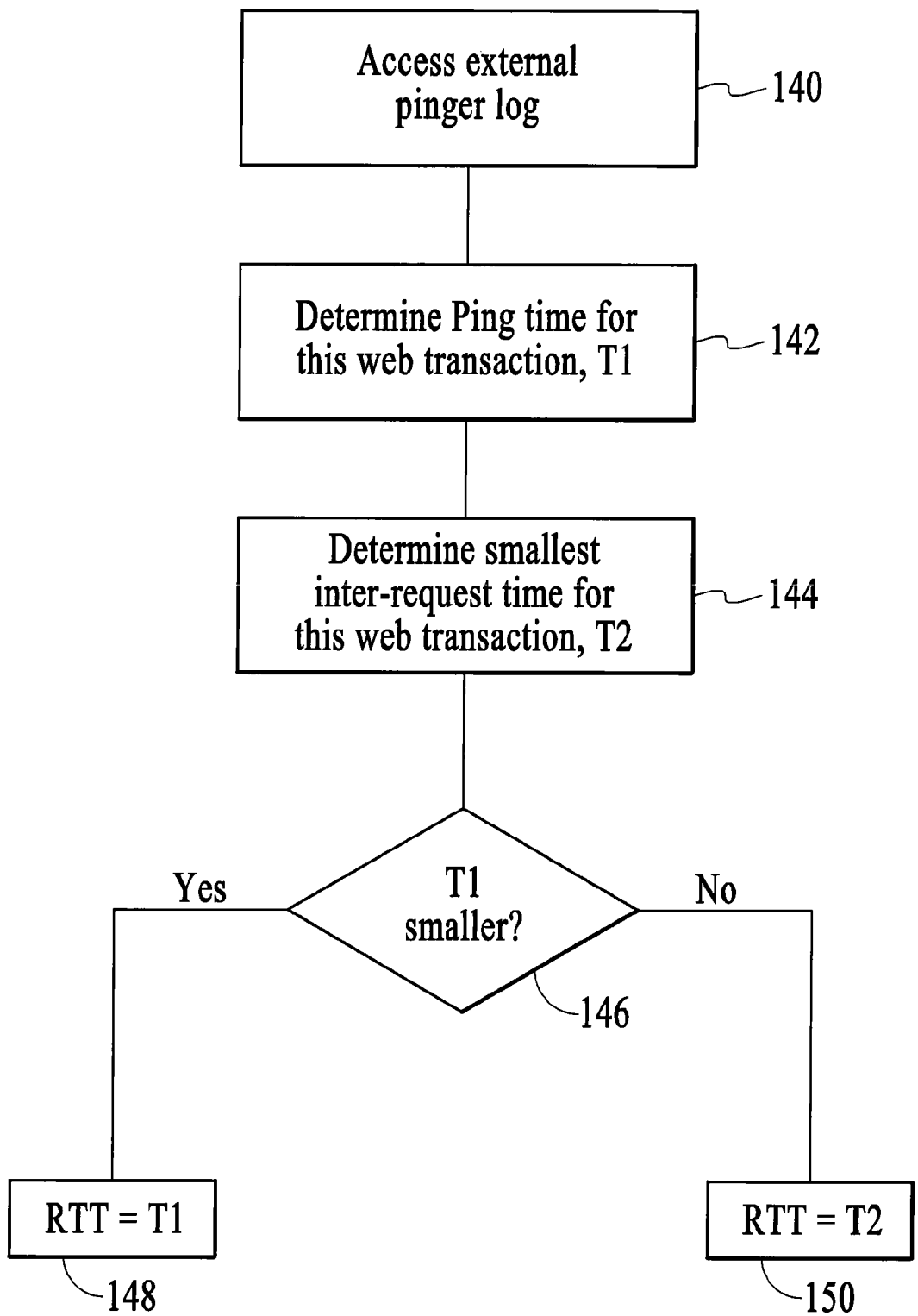
FIG. 7 is a simplified flow chart showing how an apparatus, according to the embodiment of FIG. 6, may estimate the round trip time for a given client.

Reference is now made to FIG. 7, which is a simplified flow chart showing how the round trip time estimator 129 may estimate a round trip time for a given client. The round trip time estimator accesses the log of ping times 140, and finds a respective ping time, as determined by the external pinger, for the client of a current web transaction 142. For simplicity we describe FIG. 7 as though the round trip time estimator only has to deal with a single ping time, the determined ping time, called T1. T1 serves as an initial estimate of the round trip time. The round trip lime estimator examines the logs for the current client connection, and determines the smallest inter-request time for the current web-transaction 144, the smallest inter-request time providing a second estimated round trip time T2. The round trip time estimator checks if T1 is smaller than T2 146. If T1 is smaller, the round trip time estimator estimates the round trip time to be TI 148. Otherwise, the round trip time estimator estimates the round trip time to be T2 150. It will be noted that the estimated round trip time is not the real round trip time, rather, it is larger than the real round trip time. The estimated round trip time is biased due to the size of the transmission, and that applies to a ping, even though it is a single packet. The accuracy of the estimated round trip time depends on the bandwidth, as the data being sent and received is not infinitely small. The estimation will improve as the bandwidth increases.

In fact, the estimated round trip time may be smaller than the actual, average round trip time. Different packets may take different routes, and as the more packets go from the server to the client there is a tendency towards a best route. Eventually most of the packets use the smallest round trip time, which is from the best route, and this may in fact be better than the average round trip time. The RTT as estimated is just an estimator of the real one, and is close to the average RTT but not exactly the same.

Figure 8:
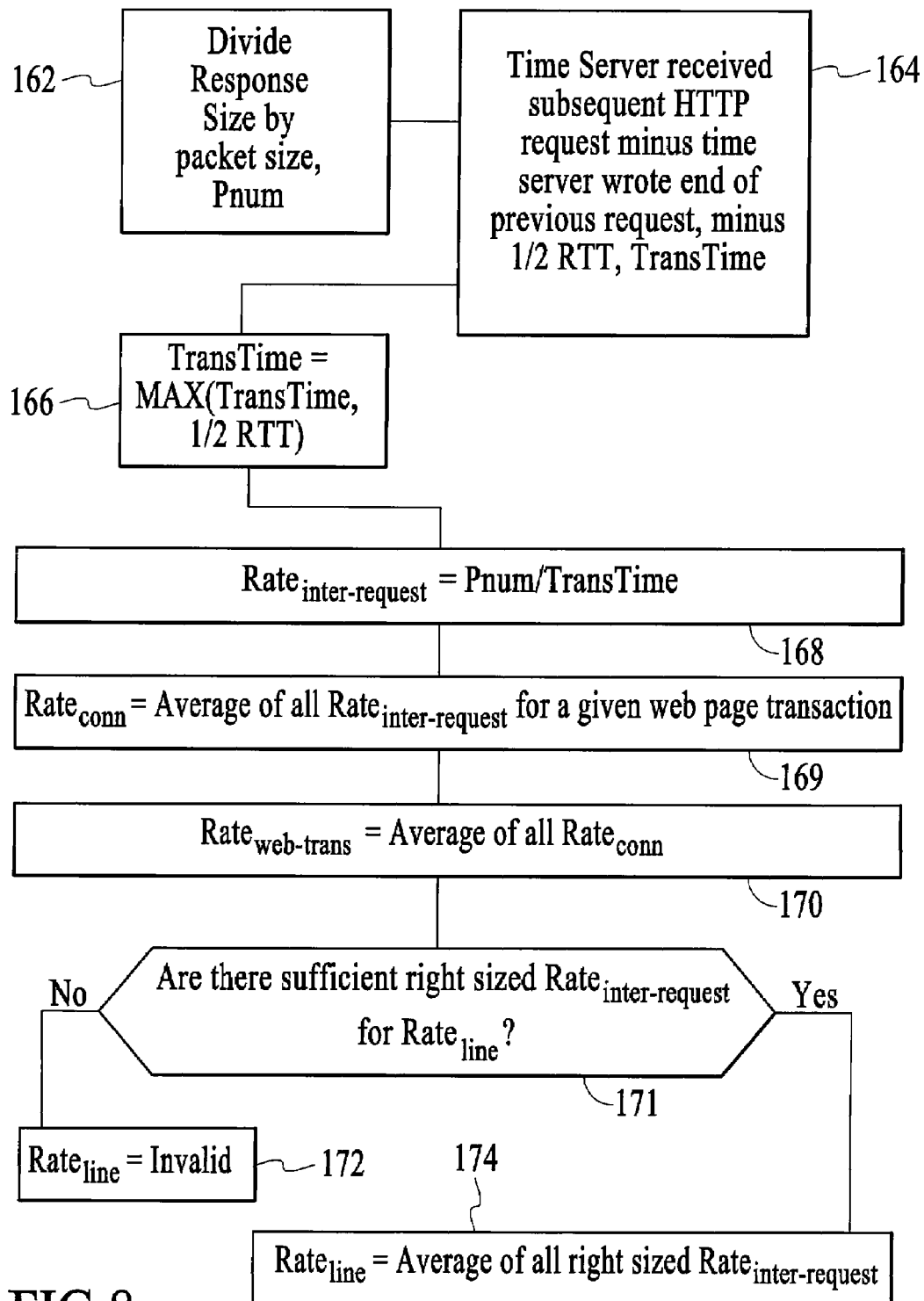
FIG. 8 is a simplified flow chart showing how an apparatus, according to the embodiment of FIG. 6, may estimate the transmission rate for a given transmission, and which describes estimations of other, more general transmission rates.

Reference is now made to FIG. 8 which is a simplified flow chart showing how the data rate estimator 124 of FIG. 6 may estimate various transmission rates. A transmission rate is a measure of how much data is sent over a given time period. In general transmission rates may be estimated by dividing an estimated transmission time by the amount of data transmitted. The Internet is a packet based network, so in the present embodiment the data rate estimator estimates a packet rate, a rate at which packets are sent, i.e. the number of packets sent in a given period of time. Before the server side latency estimator may start processing the logs, it may split the logs into web page transactions. Splitting the log into web-page transactions may be done by sorting the server's logs according to the timestamps of the events logged, and then splitting the logs according to the client IP addresses. In this manner the server side latency estimator may deal with only a small part of the log, for each client latency estimation. A perceived packet rate, a rate of transmission for a specific transmission, may be estimated by the formula:

$$\text{Preceived Packet Rate} = \frac{[\text{Response Size}_i / \text{Packet Size}]}{\max\{t_{server\_recv_{i+1}} - t_{serv\_send_i} - 0.5 \times RTT, 0.5 \times RTT\}} \quad (\text{eq. 4})$$

where:

Response Size$_i$ is the size of the present response, $t_{server\_recv_{i+1}}$ is the time the server receives a request subsequent to the present request, i, $t_{serv\_send_i}$ is the time the server starts sending the response, i, and RTT is the minimum round trip time, in accordance with the embodiment of FIG. 7.

In order to estimate the packet transmission rate, which is the perceived packet rate, alternately called Rate$_{inter-request}$, for a single response action, the perceived packet rate estimator divides 162 the response size (the number of bytes in the response, or any other applicable measurement of size), by the size of the packets (or other transmission unit) being sent across the connection, giving the approximate number of packets (or other transmission units) the server may send for the response. The data rate estimator determines a time, T$_{subsequentReq}$, when a subsequent request is received on the channel the response is sent on, provided that such a subsequent request exists.

The data rate estimator preferably determines an initial transmission time T$_{TransTime}$ by subtracting the time when the server finishes writing the response with the T$_{subsequentReq}$ request, from T$_{subsequentReq}$. The initial T$_{TransTime}$ estimation includes the time it takes for the T$_{subsequentReq}$ request to get from the client to the server. The time it takes for the T$_{subsequentReg}$ request to get to the server is not part of transmitting the response from the server to the client, so the data rate estimator subtracts half the estimated round trip time 164 estimated for the respective client determined by the round trip time estimator 129. The actual transmission time cannot be less than half the round trip time, so the data rate estimator estimates the transmission time to be the larger of half the round trip time, and T$_{TransTime}$ minus half the round trip time 166. The perceived packet rate, namely the Rate$_{inter-request}$, is estimated as the approximate number of packets the server sends, divided by the estimated transmission time 168. The data rate estimator estimates a connection perceived packet rate, namely Rate$_{conn}$, which is the average Rate$_{inter-request}$ for a given connection 169 to a given channel. The data rate estimator estimates a web transaction perceived packet rate, namely Rate$_{Web-Trans}$, which is the average Rate$_{conn}$ for all connections 170. The data rate estimator checks if there is a sufficient number of properly sized Rate$_{inter-request}$'s, that is, Rate$_{inter-request}$'s whose transmission times are within a certain time range 171. In the preferred embodiment, there may be at least four transmission times that are not larger that six times the estimated round trip time. If there are not a sufficient number of properly sized Rate$_{inter-request}$s, the data rate estimator marks the Rate$_{line}$ as invalid 172. Otherwise the data rate estimator estimates 174 a perceived packet line rate, namely Rate$_{line}$, as the average of all properly sized Rate$_{inter-request}$.

Figure 9:
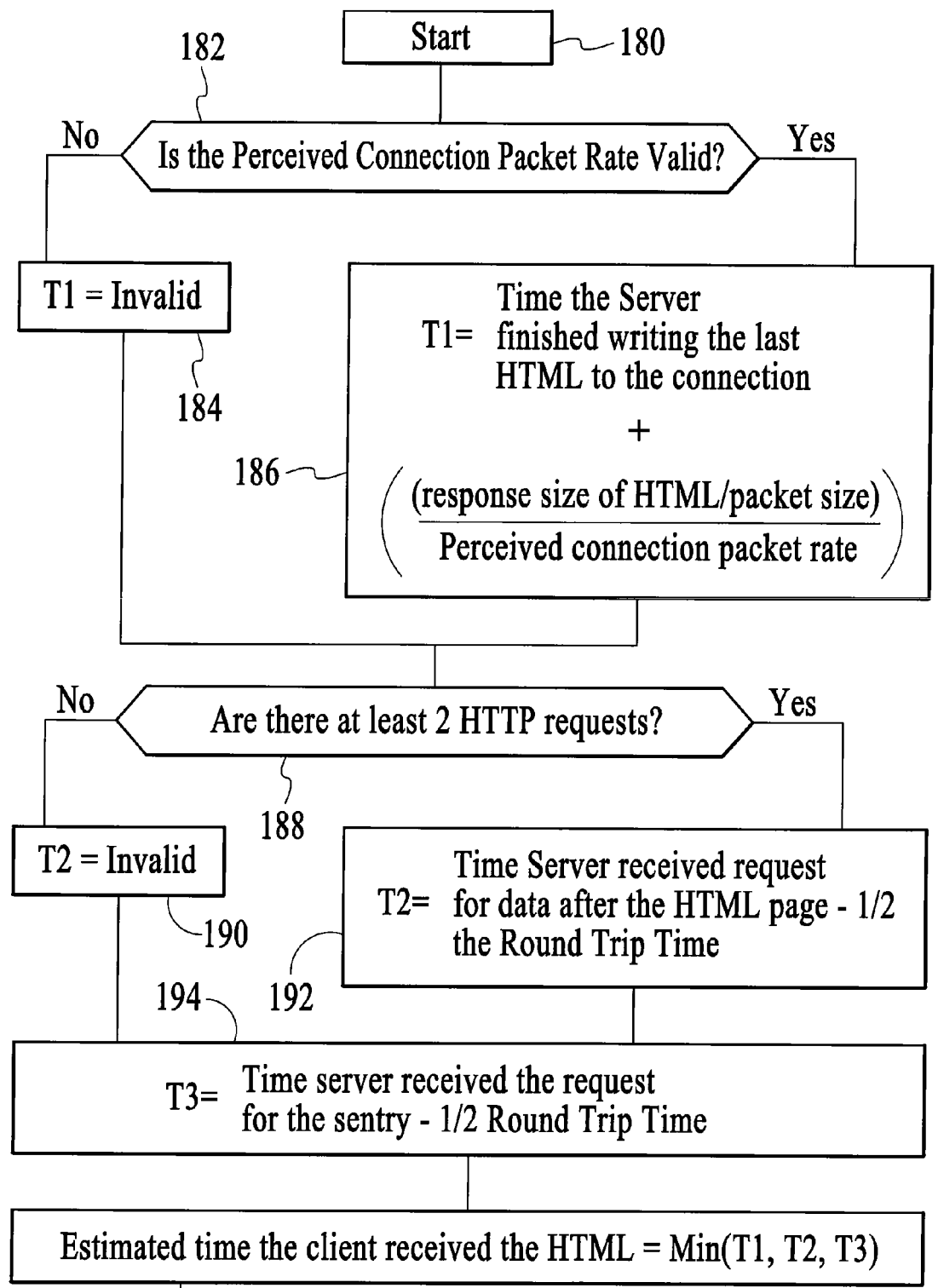
FIG. 9 is a simplified flow chart showing how an apparatus, according to the embodiment of FIG. 6, may estimate, from a server, the time when a client receives the HTML portion of a web page.

Reference is now made to FIG. 9, which is a simplified flow chart showing how a server side latency estimator may estimate the time when a client completes the receipt of the HTML portion of a web page. The time when a client completes receipt of the HTML portion of a web page may be estimated by the equation:

$$t_{client\_recv_{HTML}} = \min \begin{cases} t_{server\_send_{HTML}} + \frac{[\text{Response Size}_{HTML}/\text{Packet Size}]}{Rate_{Conn}} & \text{if } Rate_{Conn} \text{ Valid} \\ t_{server\_rec\ v_{next\_inter\_request}} - 0.5 \times RTT & \text{if at least 2 request on HTML's conn} \\ t_{server\_rec\ v_{Sentry\_image}} - 0.5 \times RTT & \end{cases} \quad (\text{eq. 5})$$

where:

$t_{server\_send_{HTML}}$ is the time the server sends the client the HTML, $t_{server\_recv_{next\_inter\_request}}$ the time the server receives the first request from the client, on the channel the server sent the HTML on, for an additional component of the web-page, $t_{server\_recv_{Sentry\_image}}$ is the time the server receives the request for the sentry, and RTT is the round trip time.

The server side latency estimator may estimate the time the client receives the HTML portion of the page based on equation 5. The server side latency estimator estimates three different times the client may have received the main page, and sets the minimum (earliest) of these estimates as an approximation of the time the client receives the HTML portion of the web page. The server side latency estimator checks if the Rate$_{Conn}$ is valid 182. If the Rate$_{Conn}$ is not valid the server side latency does not make or use an estimation dependant on the Rate$_{Conn}$ but instead marks the first preliminary estimated time the client receives the HTML, portion of the web page, T1, as invalid 184. Otherwise, in step 186, T1 is set to a time the server finishes writing the last of the HTML, portion of the web page to the present channel, plus the estimated time it takes for remaining data to be sent, once the server finishes writing the HTML, portion of the web page to the present channel. The time needed for sending the remaining data is estimated by dividing the size of the data to be sent by the packet size, giving a total number of packets to be sent. The number of packets to send is then divided by the Rate$_{Conn}$, giving an estimation of the time needed to send the remaining data. The server side latency estimator checks if there have been more than two HTTP requests 188 on the channel the server sent the HTML portion on. If there has been only one HTTP request on the channel the server sent the HTML on, the server side latency estimator does not make or use the second estimated time of receipt of the HTML, and marks T2 invalid 190. Otherwise, the server side latency estimator estimates T2 using the time the server received the second HTTP request on the present channel, minus half the round trip time 192. Assuming the server side latency estimator is using a sentry (FIG. 6, 136) the server side latency estimator makes a third estimate of the time the client receives the HTML, T3, using the time the server received the request generated by the sentry (136) minus half the round trip time 194. The server side latency estimator then estimates the time the client receives the HTML as the minimum (earliest) of the valid estimations of T1, T2, and T3 196.

Figure 10:
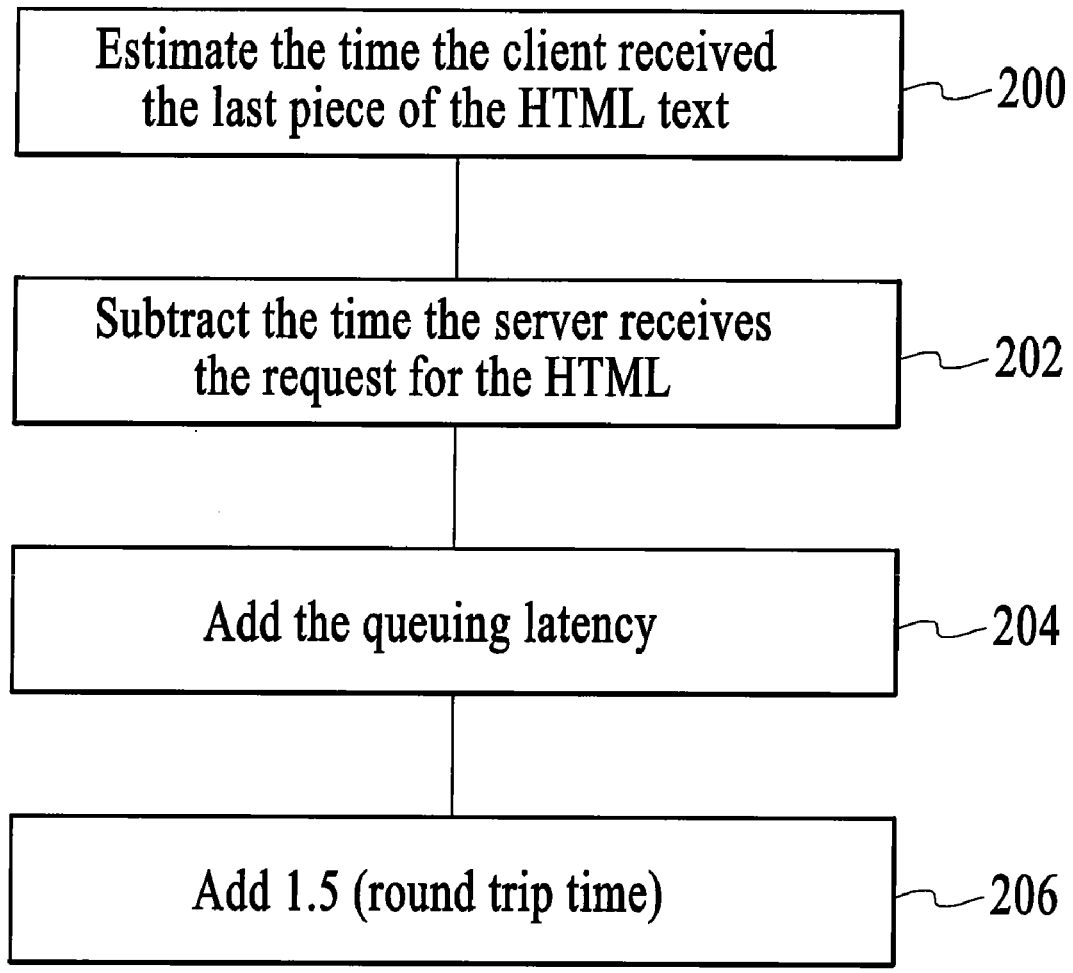
FIG. 10 is a simplified flow chart showing how an apparatus, according to the embodiment of FIG. 6, may estimate the client latency for a given download of the initial HTML text of a page.

Reference is now made to FIG. 10 which is a simplified flow chart showing how a server side latency estimator may estimate the user perceived latency for a given download of the HTML portion, namely the main page, of a page.

The client's main page latency may be estimated by the equation:

$$\text{Main Page Latency} \approx \quad\quad\quad\quad\quad\quad\quad\quad\quad\quad \text{(eq. 6)}$$

$$T_{Queueing} + 1.5 \times RTT + t_{client\_recv_{HTML}} - t_{serv\_recv_{HTML}}$$

where $T_{Queueing}$ is the queuing latency,

RTT is the round trip time, $t_{client\_recv_{HTML}}$ is the time the client receives the HTML portion of the web page, and $T_{serve\_recv_{HTML}}$ is the time the server receives the request for the HTML from the client.

The server side latency estimator estimates the time at which the client receives the HTML 200, as described in the embodiment of FIG. 9. The server side latency estimator subtracts the time the server accepts the connection from the client 202, as recorded in the logging arrangement of FIG. 5B, which is used as the approximate time the server received the request for the HTML 116. The server side latency estimator adds the queuing latency as determined by the queuing latency probe (130) 204, as an estimation of $T_{Queueing}$ and adds one and a half the estimated round trip time 206, to account for the three-way handshake time 74 (FIG. 2), necessary to establish the connection.

Figure 11:
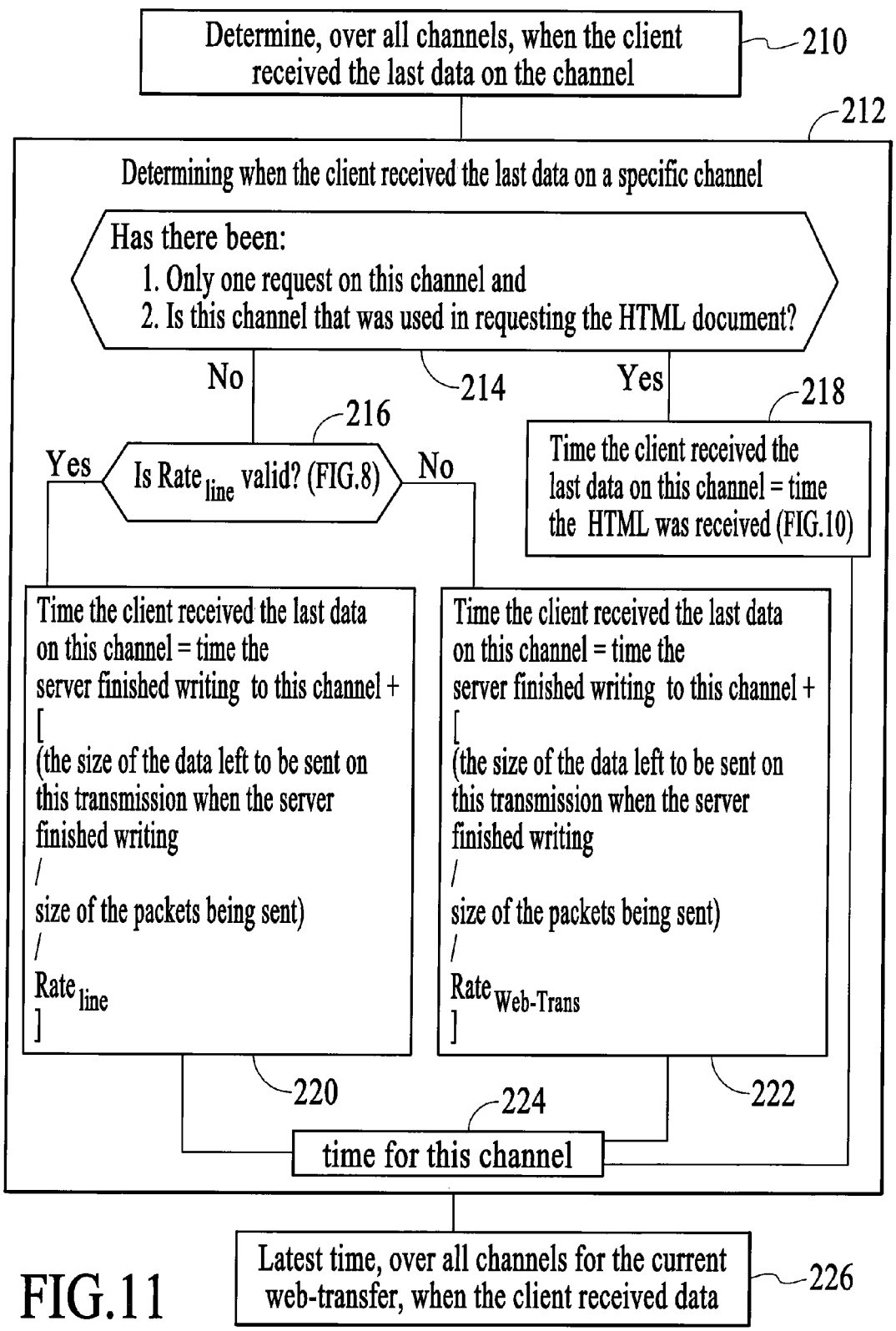
FIG. 11 is a simplified flow chart showing how an apparatus, according to the embodiment of FIG. 6, may estimate the time when a client receives an entire web page.

Reference is now made to FIG. 11, which is a simplified flow chart showing how a server side latency estimator may estimate the time when a client receives an entire web page. A given channel may carry one or more transmissions, and a given client may use more than one channel. Thus the time the client completes receipt of the entire web page may be estimated as:

$$t_{client\_recv_{Last\_Response}} = \max_{1 \leq j < N_{Conn}} \left( t_{client\_recv_{last,j}} \right) \quad\quad \text{(eq. 7)}$$

where:

$t_{client\_recv_{Last\_Response}}$ is the time the client receives the last of the server's responses, namely the time the client receives the web page, $t_{client\_recv_{last,j}}$ is the time the client receives the last response on a given channel, j, and $N_{Conn}$ is the number of connections, namely the number of channels that the client uses, in its communication with the server.

Equation 7 requires an estimation of the time the client received the last response on a given channel, which may be estimated by:

$$t_{client\_recv_{last,j}} = \begin{cases} t_{client\_recv_{html}} & \text{if } N_{html} = 1 \text{ and } j = C_{html} \\ t_{serv\_send_{last,j}} + \dfrac{\lceil \text{Response Size}_{last,j}/\text{Packet Size} \rceil}{\text{Rate}_{line}} & \text{if not } (N_{html} = 1 \text{ and } j = C_{html}) \text{ and } \text{Rate}_{line} \text{ Valid} \\ t_{serv\_send_{last\ j}} + \dfrac{\lceil \text{Response Size}_{last\ j}/\text{Packet Size} \rceil}{\text{Rate}_{Web\_Trans}} & \text{if not } (N_{html} = 1 \text{ and } j = C_{html}) \text{ and } \text{Rate}_{line} \text{ not Valid} \end{cases} \quad \text{(eq. 8)}$$

where:

$t_{client\_recv_{last,j}}$ is the time the client receives the last response on a given channel, j, $t_{client\_recv_{html}}$ is the time the client receives the HTML, $N_{HTML}$ is the number of requests on the channel of the HTML request, j is a current connection, the present channel, $C_{HTML}$ is the channel the HTML is sent on, and $$t_{serv\_send_{last,j}}$$

is the time the server finishes writing the last HTTP request into the channel j, Response size$_{last\,j}$ is the remaining part of the last response when the server finishes writing to connection j, i.e. the number of bytes left to send, and Packet Size is the size of the packets being sent.

Based on the equation 8, the server side latency estimator may perform the following analysis on all the channels a client has opened with the server 210 to determine when the client received the last data on a given channel 212.

The server side latency estimator checks 214 if, on the current channel:

(a) there has been only one request for data, and (b) there has been a request for HTML If the server side latency estimator determines that the above conditions are both true, the server side latency estimator may determine the time at which the client received the last data on the current channel to be the time the client receives the HTML, that is to say the result of FIG. 9 step 196. If the above conditions are not both true, the server side latency estimator checks if Rate$_{line}$ is valid (FIG. 8, 172, 174). If Rate$_{line}$ is valid the server side latency estimator estimates the time the client receives the last data on the current channel by taking the time the server finishes writing the last data to the channel, and adding an estimate, using Rate$_{line}$, of the time it takes for the data remaining to get to the client. The time it takes for the data remaining, to get to the client, is estimated by determining the number of packets left once the server has finished writing to the channel, and dividing the number of packets left by the Rate$_{line}$. The number of packets left is determined by dividing the size of the data remaining, when the server has finished writing the last of the data to the channel (recorded in the embodiment of FIG. 5B, 122), by the size of the packets being sent. The number of packets left is divided by the Rate$_{line}$ 220, and the result is added to the time the server finishes writing the response to the channel, to give an estimated time at which the last data from the current channel is received by the client 224. If the Rate$_{line}$ is not valid, the server side latency estimator estimates the time the client receives the last data on the current channel by taking the time the server finishes writing the last data to the channel, and adding an estimate, using Rate$_{Web-Trans}$, of the time it takes for the data remaining, to get to the Client. The time it takes for the data remaining, to get to the client, is estimated by determining the number of packets left, once the server has finished writing to the channel, and dividing the number of packets left by the Rate$_{Web-Trans}$. The number of packets left is determined by dividing the size of the data remaining to be sent, once the server has finished writing the last of the data to the channel (recorded in the embodiment of FIG. 5B, 122), by the size of the packets being sent. The number of packets left is divided by the Rate$_{Web-Trans}$ 222, the result being added to the time the server finishes writing the response to the channel, to give an estimated time at which the last data from the current channel is received by the client 224.

Based on equation 7, the above process is repeated for each channel the client opens with the server, and the time the client receives the last data for the entire web page is estimated to be the latest of the individual channel time estimates 226.

Figure 12:
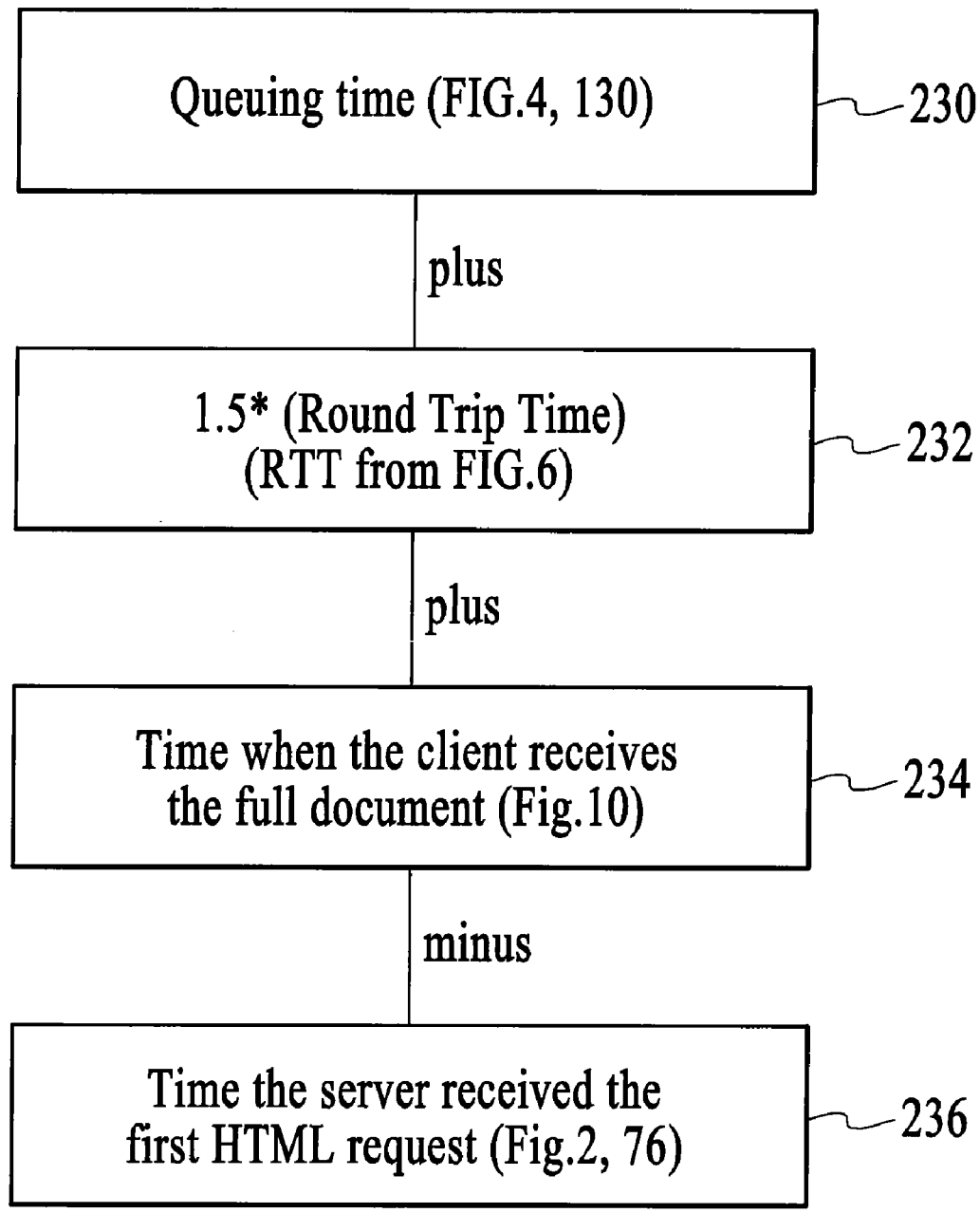
FIG. 12 is a simplified flow chart showing how an apparatus, according to the embodiment of FIG. 6, may estimate the client latency for a given download of a complete web page.

Reference is now made to FIG. 12 which is a simplified flow chart showing how a server side latency estimator may estimate a client's latency for a given download of a complete web page. FIG. 11 shows a means to estimate the time when the client receives the last of the data sent. To estimate the client's latency, it is necessary to know both when the client receives the final data, and when the client sends the initial request. From the point of view of the server there is no direct way in which to know when the client sends the initial request for the page, however the client's latency may be estimated by the equation:

Web Page Latency ≈ (eq. 9)

$$T_{Queuing} + 1.5 \times RTT + t_{client\_recv_{Last\_Response}} - t_{serv\_recv_{HTML}}$$

where:

$T_{Queueing}$ is the queuing latency, $$t_{client\_recv_{Last\_Response}}$$

is the time client receives the last response from the server, and, $$t_{serv\_recv_{HTML}}$$

is the time the server receives the request for the HTML from the client.

The server side latency estimator adds the queuing time 230, to one and a half times the round trip time 232, and then to the time when the client receives the entire document (FIG. 11, 276) 234. The server side latency estimator subtracts the time the server receives the initial request for the first HTML 236 which is to say the time the server accepts the connection on which the HTML was sent, FIG. 5B, 116, from the previous result, thereby obtaining a total web page latency.

It will be noted that the preferred embodiment of a server side latency estimator does not deal with the DNS lookup time. DNS lookup time is largely a function of the various clients ISP's and is not largely affected by a web-server's behavior, provided that the web server is listed with the root DNS servers. DNS lookup times may vary widely, but are generally only a small part of the total page loading time, and thus do not affect the estimation algorithm very much. A server may, however, verify that it does not have DNS problems. The world is divided into several zones, wherein each zone is under the responsibility of a well known root DNS server. Using a program like nslookup to query each one of the root DNS servers with a server's domain name at predetermined intervals a server may report to an administrators about DNS problems in any zone.

In a second embodiment of the server side latency estimator, clients pipeline all requests. Pipelining involves the client sending requests for subsequent page components on a channel before completely receiving previous components on that channel. Referring to FIG. 4, $t_{client\_send\_i+1}$ 298, may precede $t_{client\_receive\_i}$ 296. Today, most browsers do not implement pipelining, however present embodiments are still applicable, with minor changes, to a client that uses pipelining.

Because the client may send a request for a subsequent component, i. before the client has finished downloading a given component, measuring the round trip time, based on inter-request times, may become much less accurate. However, the ping time remains a valid estimation of the round trip time. Thus in the embodiment described in FIG. 7, the round trip time is estimated to be T1 (step 142). When a client uses pipelining, the server may write o non-empty buffers, and subsequent measuring of the various transmission rates may use the decrease in the buffer size over time, to determine the rate of data delivery, instead of the size of the entire buffer, and the inter-request time. Thus in FIG. 8, step 162 the response size may be determined to be the decrease in the buffer size over time, as opposed to the total buffer size, over the time when the client sends a subsequent request. It is noted that it is possible to simply determine a data rate, instead of the various packet rates, as the reduction in buffer size/time and this can be achieved without the need to log any further information. No new entries are needed since, at the time of finishing writing the images it is possible to make a determination of the current buffer size. At that determination it is possible to know how much of these belong to a current image and how much belong to the previous images.

In a third embodiment of the present invention the client may be served data by multiple servers. Multiple servers reduce the bottle-neck effect of a single se v and are often referred to as load balancing servers, as they balance the load from the many requests for web pages, between multiple different servers. The server side latency estimator merges the logs of the various servers. With the logs merged together the server side latency estimator proceeds in the same manner as described for a single server log.

In a fourth embodiment the client accesses the server through web-proxies. Multiple clients may use the same proxy to access a server, and each of those clients may have different connection rates, and connection times. The logs would make it appear that multiple clients accessing the server through the same proxy are the same client. The server side latency estimator may determine which client each request is from by assigning each client a cookie, and then using cookie information incorporated into the requests to determine which request is from which client.

There are some servers, which, when contacted for data, refer the client to other servers, so that a single request to a single server may lead to, downloads that come from numerous servers. For example a web site may have an advertisement, and the advertisement may be served by a server, which keeps records about the advertisements. When client browsers find references to other servers, the browser may open additional connections (channels) to those servers to download material from them. These new connections (channels) may slow down the rate of the connections (channels) to the original server, if the client has a limited bandwidth. The new requests on the already established connections (channels) to the original server may suffer from decrease in rate, which may be noticeable from the access log, which may be taken into account by server side latency estimator. In a sampling of 100 web sites, 30% of the web pages sampled have no external images, and 70% of the pages sampled have fewer then 8 external images. There are, on average 6 external images, while, on average, there are 21 embedded, or inline, images per web page. Hence, on the average, most of the images come from the original server. For 60% of the web pages the relative fraction of the external images is less then 20%. In addition it is noted that about 20% of the web pages have about 80% of their to images stored in other servers.

The server side latency estimator may accurately estimate the latency of the HTML document, in the above cases. The server side latency estimator may accurately estimate the download time of the images located in the original server, which, for most cases is the major portion of the images.

Examples

Figure 13:
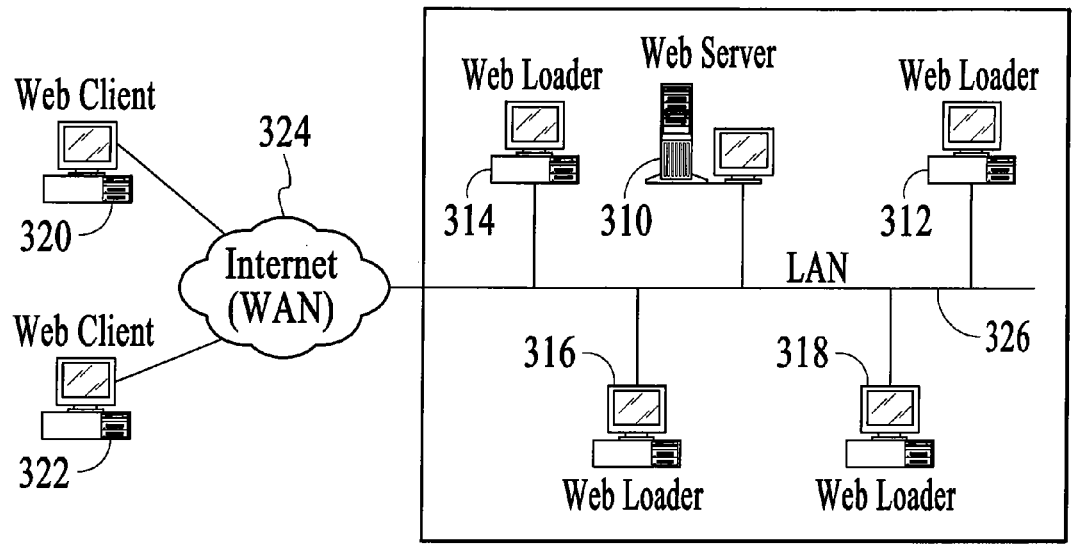
FIG. 13 is a simplified schematic of an architecture used to test a preferred embodiment of the invention.

Reference is now made to FIG. 13, which is a simplified schematic of an architecture used to test a preferred embodiment of the invention. In FIG. 13 there is a web-server 310, which is connected to a LAN 326. The LAN has four computers, 312, 314, 316, 318, which serve to send requests to the web-server. These requests may simulate various loads on the web server. The LAN is connected to a WAN, and the Internet 324, which is connected to two web-client simulators, 320, and 322, located at various distances from the server.

The server side latency estimator was implemented on an Apache web-server 310, running version 1.3.9, a public domain HTTP/1.1 server. Measurements were conducted at three locations, namely at the web server, referred to as TAU, 310, and at both clients 320, and 322. One web client, called MTA 320, was located relatively close to the server, and one, called UCI, 322 client, was located relatively far from the server.

In order to make an evaluation representative of a real client's latency it is preferable to simulate real clients with real-world web traffic characteristics (bandwidth, RTT and loss rate, loss rate being the rate of lost packets), fetching different web pages under various server loads. Also, in order to estimate the server side latency estimator's performance it is preferable to know the actual latencies the clients experience.

The web server 310 includes three elements, the modified Apache Web server, the queuing latency probe and the external pinger. The server 310 runs on a dedicated PC running the Linux operating system version 2.2.14. The hardware platform is an Intel Pentium III 550 MHz system, with 512 M of memory and 512 K cache. The disk size is 6 Gigabyte. The server 310 has a standard 100 Mbit/sec Ethernet card, which is connected to a 1 Gbit/sec LAN.

In order to evaluate the server side latency estimator, web clients, 320, 322, that simulate a web browser, and perform measurements of the main page latency, the web page latency and other parameters like RTT, are needed. A multi-thread web browser program utilizing a BSD-socket interface was implemented to perform these functions. The web-browser program supported HTTP/1.1 persistent connections (channels) and simulated the dependency between the request for the HTML document and the requests for the embedded images. The program fetched whole web pages (HTML document and embedded images) using a predefined number of persistent TCP connections. After fetching the whole web page all the threads closed the connections and the master program wrote in a log file, called the client log file, the RTT, the main page latency and the web page latency.

In order to test real world conditions, it is necessary to generate server load, that is, it is necessary to test the server side latency estimator when the server receives a varying number of requests. To generate the load, a program called web loader was implemented. Web loader was based on the web browser program with a few modifications. Web loader used a fixed number of threads. Each thread ran in an infinite loop with the same task: open a TCP connection to the server, fetch one file from server and close the connection. Each web loader simulated several clients, from a single computer. A computer ran ten web loader threads. In order to generate the various loads that might be experienced by a server in a real world environment, several computers 312, 314, 316, 318, running the web loader program were located on the same LAN, 236, that the server, TAU, 310 was located on. FIG. 13 shows four such computers used with the web loader program to generate the appropriate load on the server. During testing, between zero and nine computers are used with the web-loader program, as will be explained in greater detail below.

In order to generate web pages for testing which were representative of the web, various rating sites were used to gather information about typical web browsers, and typical web pages. Information regarding typical HTML document size, the number of embedded images and their typical size, for popular web pages was gathered. Several rating sites offer statistics on popular web sites, for example, Hot100 (http://www.100hot.com), which surveys 100,000 users (40% of whom are outside the USA) and gathers data at "strategic" points on the Internet (not at the browser or server). For those top 100 sites the average HTML document size is currently given as 30 K, and there are on average 21 embedded images, each with an average size of 2.5 K. Using the above data, the following web page dimensions were selected as representative: combinations of HTML document sizes 10 K, 30 K and 60 K with 5, 15, 30 and 50 embedded images with an average size of 2 K-3 K. Based on these selections, 12 various pages were generated as representative of typical web pages. Two additional web pages were used, 1. a web page with a 30 K HTML document and 21 embedded images of average size 6 K (a web page with a large number of images, creating many inter-request times), and 2. a web page, which included only 2 images, which would generate very few inter-request times. In total 14 various web pages were used in testing. To more accurately reflect real world circumstances pages from the top 100 Web pages were also selected and used in testing, and this data is used to produce the results shown in FIGS. 7-9. Estimation of a preferred embodiment of a server side latency estimator's accuracy used clients connecting through a WAN 324 in order to simulate real world web-traffic characteristics using the WAN it is necessary to simulate:

(a) large RTT variations,
(b) packet loss, and
(c) various bandwidth characteristics.

The PingER project at Stanford Accelerator Center (SLAC) (L. Cottrell, W. Matthews, and C. Logg. Tutorial on internet monitoring pinger at SLAC. Available from http://www.slac.stanford.edu/comp/net/wanmon/tutorial.html/, 1999) conducts continuous network monitoring to measure network latency and packet loss over the Internet. The PingER measurements show average loss rate of 0.5% and RTT of 30-60 milliseconds in the U.S., Asia and Europe, while between the continents the average loss rate is of 1.4% and RTT varies between 200 to 600 milliseconds.

The server side latency estimator experiments were conducted at various hours of the day, over a one week span. During the week of experiments, the clients' network characteristics, in terms of RTT, bandwidth and loss rate were measured. UCI's, 322, RTT was 600-620 milliseconds, bandwidth 30-40 KB/s and loss rate of 0%. MTA's, 320, RTT was 30-100 milliseconds, bandwidth 5-17 KB/s and loss rate of 2%. UCI's, 322, RTT reflect longer network RTT to the US from the server (located in Tel-Aviv). UCI's, 322, MT, bandwidth, and loss rate showed a minor disparity. MTA, 320, showed large disparity in the RTT and in the bandwidth. The two sites chosen thus show good representation of real-world web traffic characteristics, as they cover large ranges of RTT, bandwidth and loss rate.

A series of test runs were conducted in the following manner: each web-client located in MTA or UCI fetched all the 14 Web pages in serial fashion. For each web page the web browser simulator first fetched the respective pages with 4 persistent connections (four channels), 5 times and later the web browser simulator fetched the respective pages, with 2 persistent connections (two channels), 5 times. Between each web page download, the web browser waited for 4 seconds. The tests were repeated under various server loads. The server load was compared by a number of web loader computers running in the server's LAN. The number of web loader computers was varied between 0-9, which means the server experienced a load of between 0 and 90 clients. Four server loads were used: Light, medium, high and overloaded, as described in the chart below:

| Load | CPU Usage [%] | Requests Per Sec | Average Queuing latency [msec] | No. Of Web Loaders |
| --- | --- | --- | --- | --- |
| Light | 3 | 7 | 1 | 0 |
| Medium | 20 | 68 | 20 | 1 |
| High | 50 | 75 | 500 | 4 |
| Overloaded | 90 | 56 | 6000 | 9 |

Figure 14:
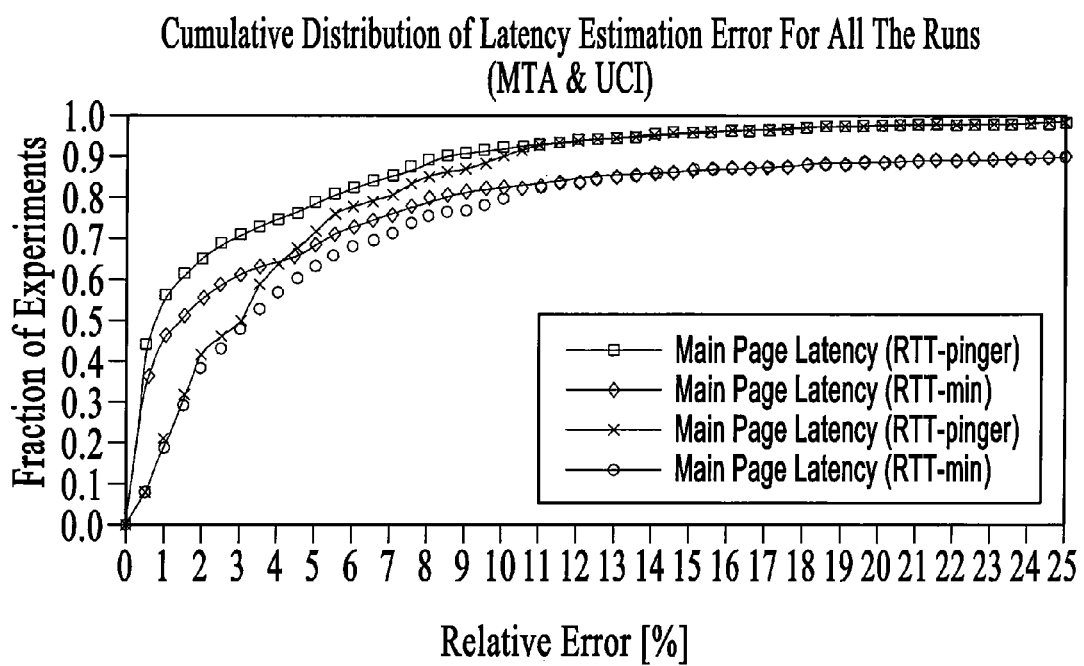
FIG. 14 is a graph of accuracies for measurements of the main page latency, and web page latency.
Figure 15A:
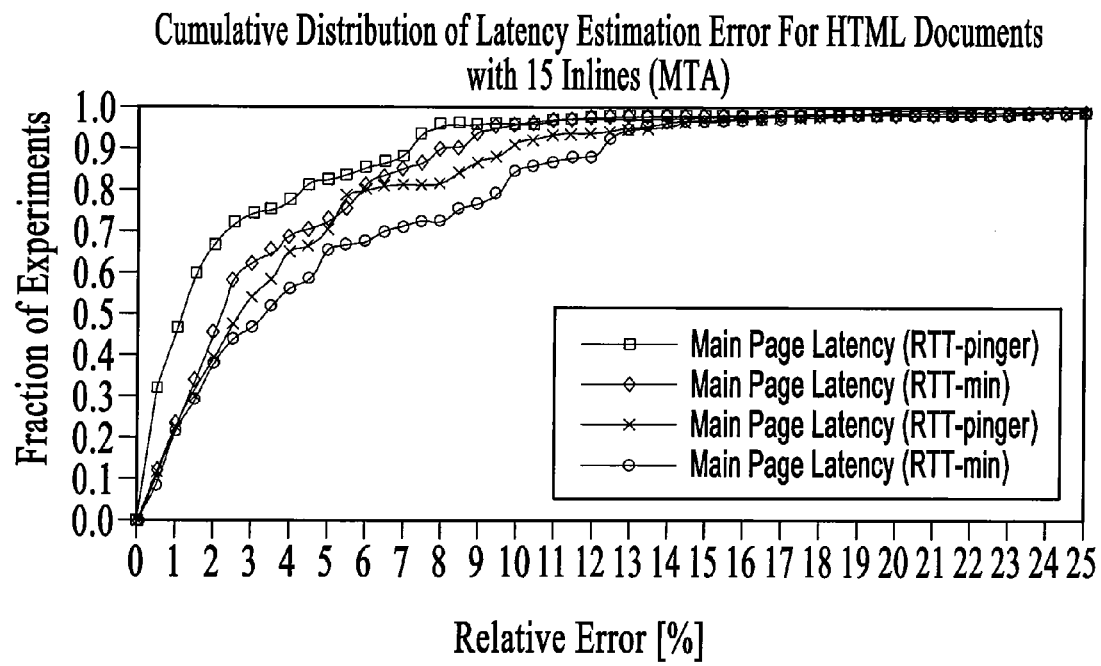
FIGS. 15 A 15 B 15C and 15 D, 16A and 16 B are cumulative distributions of latency estimation error, and RTT error, for typical web pages where the server is under a normal load.
Figure 15B:
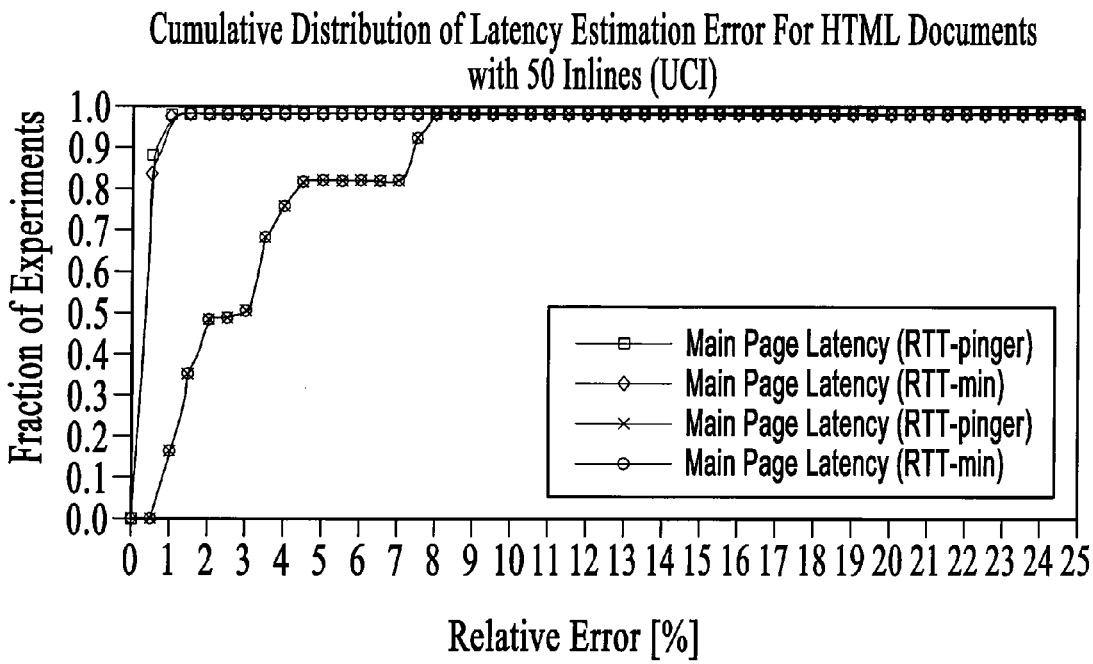
Figure 15C:
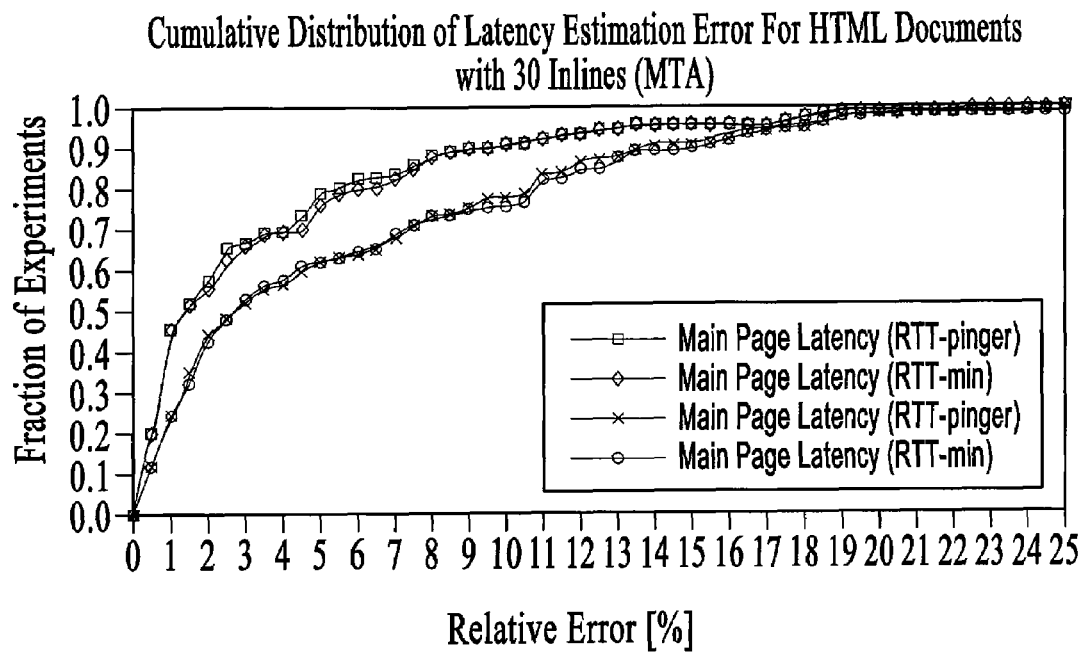
Figure 15D:
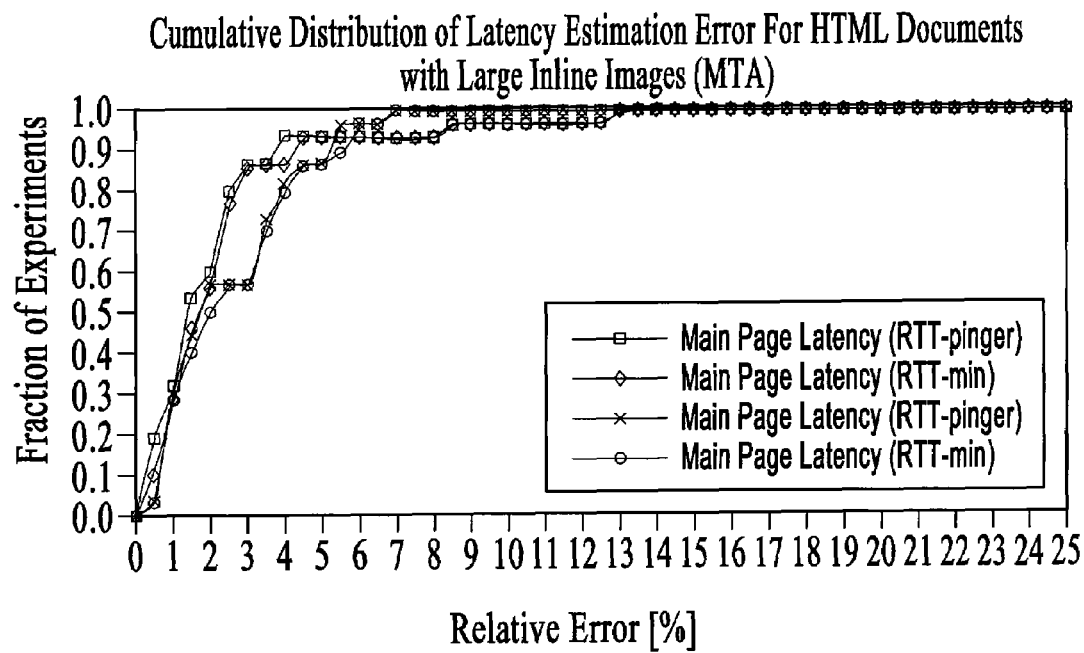

Reference is now made to FIG. 14 which is a graph of the accuracies for the main page latency, and web page latency FIG. 14 depicts the accuracy of the server side latency estimator's main page latency, and web page latency, estimations, for all the tests runs for both of the clients under the various server loads. The graph of FIG. 14 also shows the server side latency estimator's accuracy for the RTT (RTTmin from the inter request times, or the estimated RI from the external pinger). It should be clear that the external pinger is an integral part of a preferred embodiment of the server side latency estimator. The performance of the server side latency estimator is preferably evaluated using the pinger for estimating the RTT More precisely, what may be used is a minimum of a ping time and the minimum inter-request time. The table below summarizes the median and average of the estimation error. The table below shows the median value of the estimation error as the average values are shifted by the few high errors in the tests runs using an overloaded server. The average latency estimation error of a preferred embodiment of the server side latency estimator, for the various tested web pages, is 4% under normal server loads, and 10% when the server is overloaded. For the tested web pages with few embedded images the server side latency estimator uses the external pinger for accurate RTT estimations.

| Meaning | Average | | | | Median | | | |
| --- | --- | --- | --- | --- | --- | --- | --- | --- |
| | RTTmin (1) | | Pinger | | RTTmin (1) | | Pinger | |
| RTT Estimation Method | Main Page Error | Web Page Error | Main Page Error | Web Page Error | Main Page Error | Web Page Error | Main Page Error | Web Page Error |
| All runs | 8.8 | 11.2 | 4.0 | 4.8 | 1.4 | 3.3 | 0.7 | 3.0 |

(1) RTTmin is used only if RIT is not available from the pinger.

The experiments seems to show that the accuracy of the tested embodiment of the server side latency estimator is not affected by the normal server load (light, medium and high, but not overloaded), therefore the different load results are aggregated together.

Reference is now made to FIGS. 15A, 15B, 15C and 15D, which are cumulative distributions of latency estimation error, and RTT error, for typical web-pages. FIG. 15 A is a graph of the error of a page using 15 embedded images, from a relatively close client, MTA, 320. FIG. 15 B is a graph of the error of a page using 50 embedded images, from a relatively distant client, UCI, 322. FIG. 15 C is a graph of the error of a page using 30 embedded images, from a relatively close client, MTA, 320. FIG. 15 D is a graph of the error of a page using large embedded images, from a relatively distant client, UCI, 322.

FIGS. 15A, 15B, 15C, and 15D, depict the accuracy of the server side latency estimator's, main page latency, web page latency, and RTT estimations as a function of the number of the embedded images, for both of the tested clients. The runs of client downloads of web pages with the same number of embedded images, under various server loads are aggregated to form graphs. For 15, 30 and 50 embedded images, the latency estimation errors for MTA and UCI's are similar so MTA's errors are presented for web pages with 15 and 30 embedded images and UCI's errors are presented for web pages with 50 embedded images. The below table summarizes the average estimation errors. For typical web pages the latency estimation error for both clients does not depend on the number of embedded images or on the method of estimating the RTT. Hence, the effect of the external pinger for typical web pages is 15 negligible. For a web page with large embedded images there is no significant change in the estimation error.

| Client RTT | MTA | | | | UCI | | | |
|---|---|---|---|---|---|---|---|---|
| Estimation Method | RTTmin (1) | | Pinger | | RTTmin (1) | | Pinger | |
| No. of embedded images | Main Page Error | Web Page Error | Main Page Error | Web Page Error | Main Page Error | Web Page Error | Main Page Error | Web Page Error |
| 15 | 4.5 | 5.6 | 3.5 | 4.8 | 0.5 | 1.9 | 0.5 | 1.9 |
| 21(2) | 2.3 | 2.4 | 2.2 | 2.3 | 0.3 | 2.4 | 0.2 | 2.4 |
| 30 | 3.5 | 5.5 | 3.4 | 5.4 | 0.2 | 3.2 | 0.2 | 3.2 |
| 50 | 4.3 | 6.1 | 4.3 | 6.1 | 0.7 | 3.3 | 0.7 | 3.3 |

(1) RTTmin is used only if RTT is not available from the pinger.
(2) Web page with large embedded images, on average of 6 K.

Figure 16A:
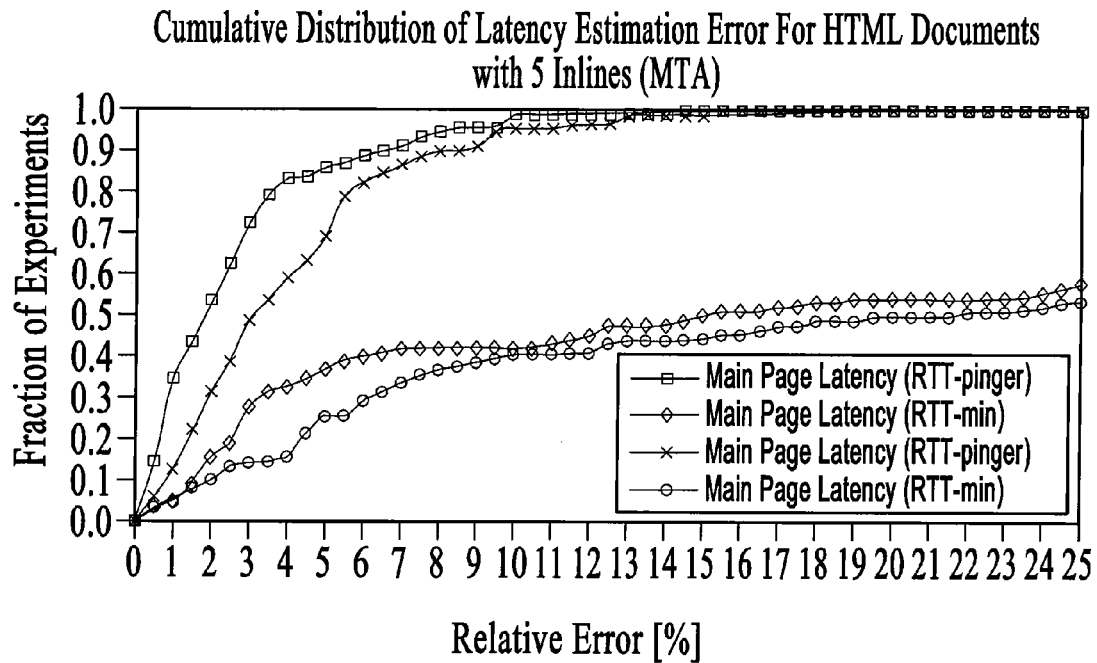
Figure 16B:
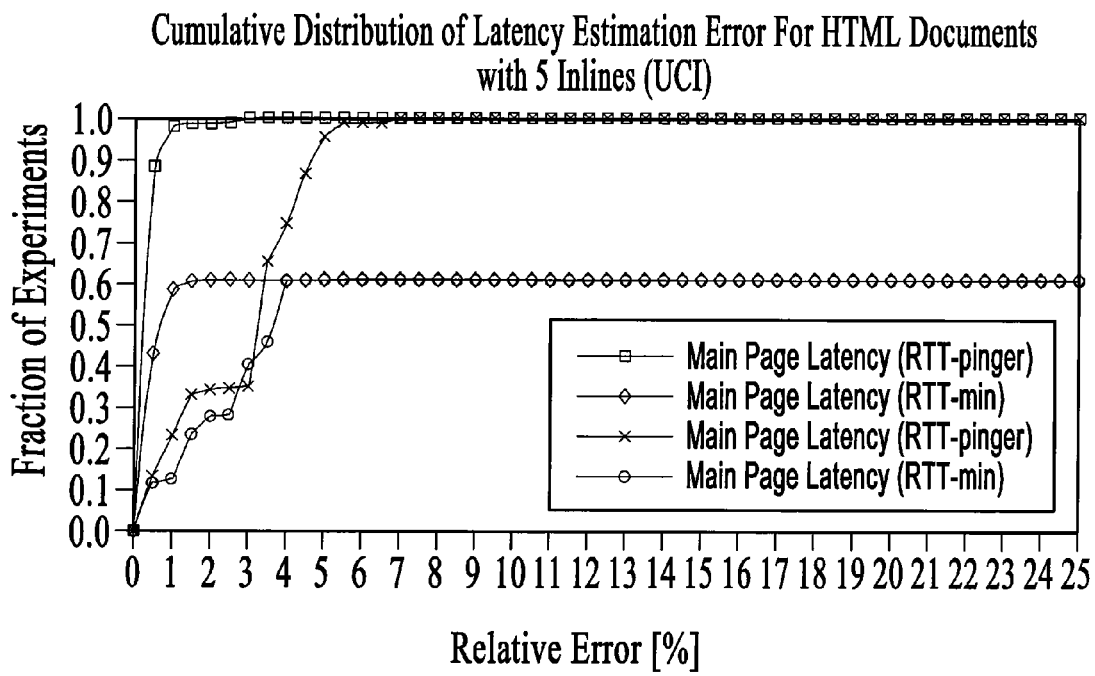

The average estimation error for MTA is larger than the error estimated for UCI because: 1) UCI has high bandwidth. 2) MTA has high packet loss. It is concluded that the average latency estimation error is 4% for a typical web page, Reference is now made to FIGS. 16 A and 16B FIG. 16A is a graph of the cumulative distribution of latency estimation error for HTML documents, with five inline images, for the client simulator at MTA, FIG. 16B is a graph of the cumulative distribution of latency estimation error for HTML documents, with five inline images, for the client simulator at UCI. FIGS. 16 A and B depict the accuracy of main page latency and web page latency as estimated by the server side latency estimator for web pages with few embedded (inline) images. The latency estimation error for web pages with two and five embedded images behave similarly so the error for web pages with five embedded images is presented. Each figure also depicts the effect of the method for estimating the RTT. The below table summarizes the average errors for UCI and MTA. In a web page with few embedded images is necessary to use the external pinger to estimate the RTT and not rely only on the RTTmin. The error decreases in some case from an average error of 90% to an average error of 6%. For web pages with few embedded images, the server side latency estimator's estimations of the main page latency, and the web page latency, are as good as the estimations for web pages with many embedded images.

| Client RTT | MTA | | | | UCI | | | |
|---|---|---|---|---|---|---|---|---|
| Estimation Method | RTTmin (1) | | Pinger | | RTTmin (1) | | Pinger | |
| No. of embedded images | Main Page Error | Web Page Error | Main Page Error | Web Page Error | Main Page Error | Web Page Error | Main Page Error | Web Page Error |
| 2 | 75.7 | 91.6 | 0.6 | 5.6 | 38.1 | 40.1 | 0.1 | 7.6 |
| 5 | 32.3 | 46.4 | 2.6 | 3.9 | 19.1 | 23.9 | 0.3 | 2.7 |

(1) RTTmin is used only if RTT is not available from the pinger.

Figure 17A:
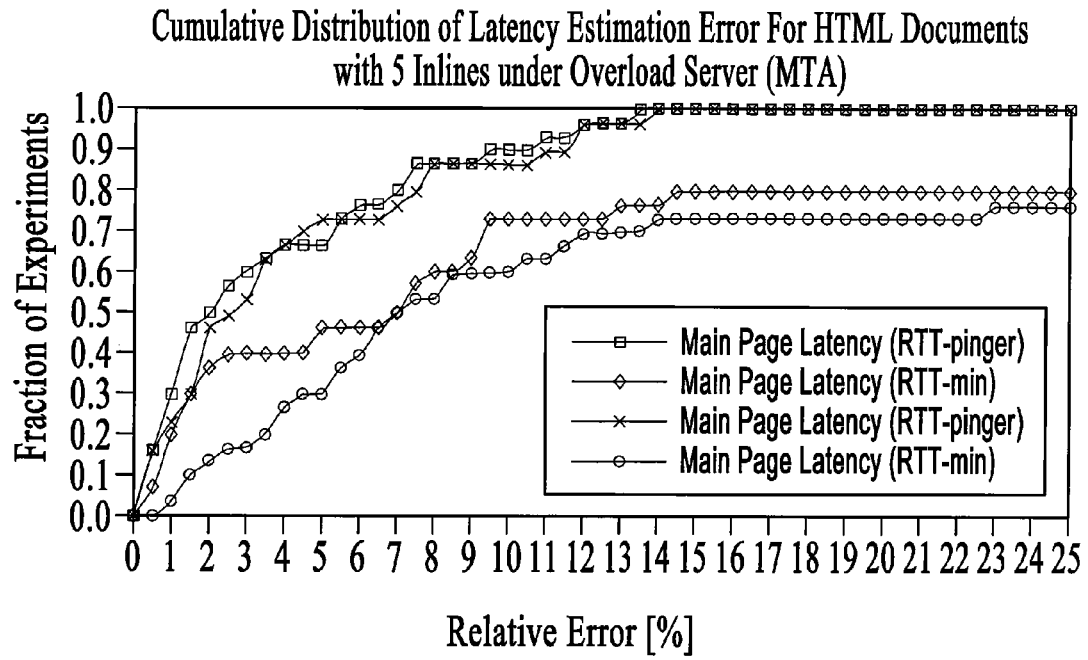
FIGS. 17A and 17B are cumulative distributions of latency estimation error, for typical HTML, where the server is overloaded.
Figure 17B:
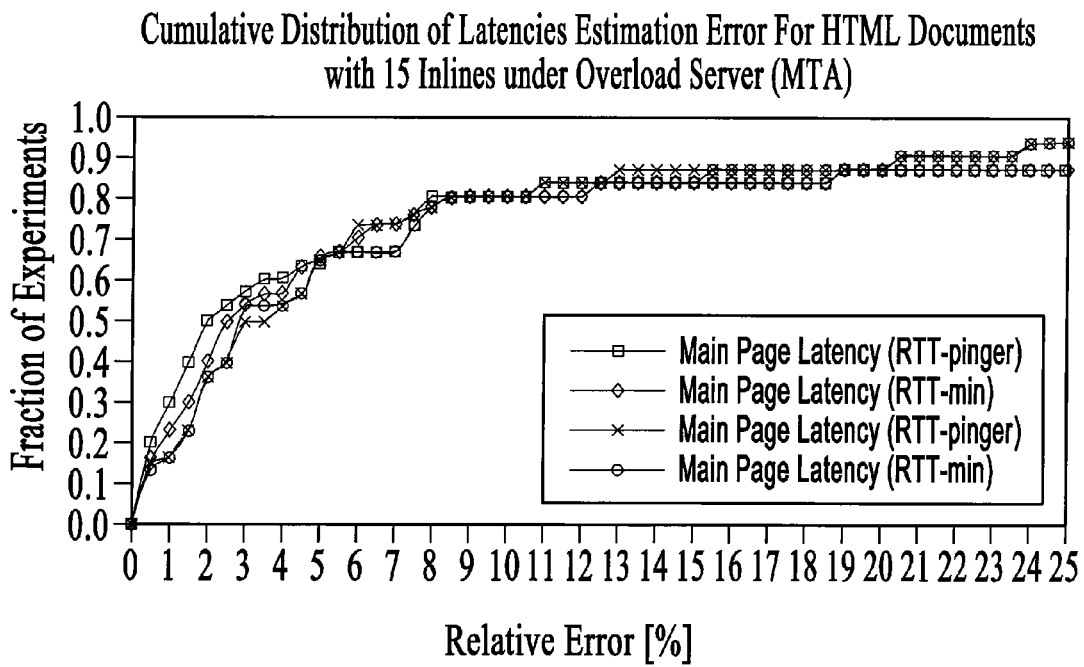

Reference is now made to FIGS. 17A and 17B which are graphs of the cumulative distribution of latency estimation error for web pages with various numbers of embedded (inlined) images, where the estimations were made using data collected on a server that was overloaded. FIG. 17A is a graph of the cumulative distribution of latency estimation error for web pages with few embedded (inlined) images, with the estimations made using data collected on a server that was overloaded, while FIG. 17B is a cumulative distribution of latency estimation error for web pages with an intermediate number of embedded (inlined) images, with the estimations made using data collected on a server that was overloaded.

FIGS. 17A and 17B depict only the runs with 5 and 15 embedded images as other tests showed similar behavior, and these are representative. UCI's results are not shown, as they exhibit similar behavior. The runs of web pages with the same number of embedded images are aggregated. Each figure depicts the accuracy of an embodiment of the server side latency estimator for estimating the RTT. The below table summarizes the median and average of the latency estimation errors for the serve side latency estimator at MTA. The behavior of the latency estimation error is similar for the tests run under normal server load and overload server load as may be seen in FIGS. 15A, 15B, 15C, 15D, 16A, 16B and 17A and 17,B, with the exception of the long tail in the overloaded cases FIGS. 17 A and 17B. On an overloaded server there are periods of tune in which the queuing latency increase rapidly in short time. The queuing latency probe of the present embodiment samples the queuing latency at a low frequency. If the queuing latency probe were to sample the queue at high frequency, the estimation accuracy of server side estimator, for an overloaded server, may go up dramatically. There is need for the external pinger only for web pages with few embedded images. The average latency estimation error is 10%, in contrast the median latency estimation error is only 4%.

| Meaning RTT Estimation Method | Average | | | | Median | | | |
|---|---|---|---|---|---|---|---|---|
| | RTTmin (1) | | Pinger | | RTTmin (1) | | Pinger | |
| No. of embedded images | Main Page Error | Web Page Error | Main Page Error | Web Page Error | Main Page Error | Web Page Error | Main Page Error | Web Page Error |
| 5 | 14.3 | 20.7 | 3.6 | 3.9 | 7.0 | 7.1 | 1.9 | 2.5 |
| 15 | 10.5 | 9.6 | 10.1 | 9.5 | 2.8 | 2.5 | 2.0 | 2.9 |
| 30 | 10.3 | 6.1 | 10.3 | 6.1 | 4.9 | 2.3 | 4.9 | 2.3 |
| 50 | 8.6 | 11.5 | 8.5 | 11.5 | 1.2 | 7.7 | 1.2 | 7.7 |

(1) RTTmin is used only if RTT is not available from the pinger.

In the presented tests, the server CPU overhead due to the additional fields logged is 0.15%. The queuing latency probe samples the server every four seconds, which adds an average 0.025% CPU overhead. The external pinger runs once every 30 seconds, which adds, on average 0.04% CPU overhead. Hence, the total average server CPU overhead due to our measurements is less then 0.2%.

There is thus provided, in accordance with the above embodiments, a system which allows for server end measurement of actual client experienced latencies in downloading data. The latencies can be used to provide a content provider with a clear picture of performance of his website.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. An apparatus for estimating a web page latency for a web page transaction, comprising:
a server, including one or more processors, configured to estimate a queuing latency time for the server to accept a new request from a client and establish a connection with the client ($T_{QUEUING}$), wherein the server is configured to estimate a round trip time between the server and the client (RTT), wherein the server is configured to estimate a time required for the client to receive a web page ($T_{CLIENT\_RECV}$) pursuant to the request, wherein the server is configured to determine a time the server receives the request ($T_{SERVE\_RECV}$) from the client, wherein the server is configured to provide the web page to the client responsive to the received request, and wherein the server is configured to estimate a client perceived latency from when the client sends the request and receives back the web page according to the estimated queuing latency time $T_{QUEUING}$, the estimated round trip time RTT, and a difference between the estimated time required for the client to receive the web page pursuant to the request $T_{CLIENT\_RECV}$ and the determined time the server receives the request $T_{SERVE\_RECV}$.

2. The apparatus according to claim 1 wherein the one or more processors are further configured to estimate a main page latency for receiving Hyper Text Markup Language (HTML) for a main web page of the web page transaction according to:

$$T_{QUEUING}+(1.5\times RTT)+T_{CLIENT\_RECV-HTML}-T_{SERVE\_RECV},$$

wherein $T_{CLIENT\_RECV-HTML}$ is an estimated time the client receives an HTML portion of the web page and $T_{SERVE\_RECV}$ is the time the server receives the request from the client for the HTML.

3. The apparatus according to claim 1 wherein the one or more processors are further configured to identify multiple different connections the client opens with the server for the web page transaction and use a last sent data on any of the multiple different connections for estimating the time $T_{CLIENT\_RECV}$ when the client receives the web page.

4. The apparatus according to claim 1 wherein the one or more processors are further configured to operate a queuing probe that measures the queuing latency $T_{QUEUING}$ by identifying a time required for the server to accept a new Transmission Control Protocol/Internet Protocol (TCP/IP) connection request from the client.

5. The apparatus according to claim 1 wherein the one or more processors are further configured to:
insert a sentry in web page Hyper Text Markup Language (HTML) sent by the server to the client, the sentry prompting the client to send a request back to the server when substantially all of the HTML for the web page is downloaded by the client; and
use the client request to determine the time $T_{CLIENT\_RECV}$ when the client received the last of the web page data.

6. The apparatus according to claim 5 wherein the sentry is located at the end of the web page sent to the client by the server.

7. The apparatus according to claim 1 wherein the one or more processors are further configured to:
identify a ping time (T1) for the current web transaction;
use the ping time T1 as an initial estimate of the round trip time RTT between the server and the client;
search logs for a smallest inter-request time (T2) for the web transaction, the inter-request time being a time between the server sending a response to the client and the server receiving a subsequent request back from the client on a same channel; and
use the smaller of the ping time T1 and the inter-request time T2 as an estimation of the round trip time RTT between the client and the server.

8. The apparatus according to claim 1 wherein the one or more processors are further configured to:
estimate perceived packet rates ($Rate_{INTER-REQUEST}$) for each new download of web page data to the client;
estimate connection packet rates ($Rate_{CONN}$) by averaging the perceived packet rates $Rate_{INTER-REQUEST}$ for each particular connection to a particular channel of the web page transaction; and
estimate a web transaction packet rate ($Rate_{WEB-TRANS}$) for the entire web transaction by averaging the estimated connection packet rates $Rate_{CONN}$ for the different connections used in the web page transaction.

9. The apparatus according to claim 8 wherein the one or more processors are further configured to estimate the perceived packet rates $Rate_{INTER-REQUEST}$ as follows:

$$\text{Rate}_{INTER-REQUEST} = \frac{[\text{RESPONSE SIZE}_i \div \text{PACKET SIZE}]}{\max\{T_{SERVER\_RECVi+1} - T_{SERV\_SENDi} - 0.5 \times RTT, 0.5RTT\}}$$

where:
RESPONSE SIZE$_i$ is a size of a web page response to the client;
PACKET SIZE is a size of packets sent from the server to the client;
$T_{SERVER\_RECVi+1}$ is a time the server receives a request subsequent to a present request i; and
$T_{SERV\_SENDi}$ is a time the server starts sending a response to the present request i.

10. The apparatus according to claim 1 wherein the one or more processors are further configured to:
identify a time T1 for the server to finish writing any remaining data for the web page to a channel, the time T1 including the estimated time it takes for the remaining data to arrive at the client once the server finishes writing the data to the channel;
identify a time T2 for the server to receive a request for data from the client after writing the data, the time T2 offset by half the round trip time RTT;
identify a time T3 when the server receives a sentry request back from the client, the time T3 offset by half the round trip time RTT and the sentry request contained in Hyper Text Markup Language (HTML) sent by the server that prompts the client to send a request back to the server when substantially all of the HTML for the web page has been downloaded by the client;
estimate the time when the client receives the web page $T_{CLIENT\_RECV}$ as a minimum or earliest of T1, T2, and T3.

11. The apparatus according to claim 1 wherein the one or more processors are further configured to estimate a time ($T_{CLIENT\_REV-LAST\_RESPONSE}$) when the client receives the entire web page that includes a Hyper Text Markup Language (HTML) portion of the web page and images or other components, if any, contained in the web page, the one or more processors configured to:
identify the channels that the client has opened with the server for the web transaction;
estimate $T_{CLIENT\_REV-LAST\_RESPONSE}$ as a time the client receives the HTML for the web page when there is only one request for data on a current channel for the web transaction and the current channel is used requesting the HTML.

12. The apparatus according to claim 1 wherein when more than one request for data is made on the current channel or when the current channel is not used for requesting the HTML, the one or more processors are further configured to:
estimate $T_{CLIENT\_REV-LAST\_RESPONSE}$ as a time when the server finishes writing remaining data for the web page to the current channel plus an estimated time required for the remaining data to arrive at the client.

13. The apparatus according to claim 12 wherein:
when an estimated line rate (Rate$_{LINE}$) is valid, the time when the data for the web page arrives at the client is estimated by determining a number of remaining packets once the server has finished writing to the current channel and dividing the number of remaining packets by the line rate (Rate$_{LINE}$); and
when the estimated line rate Rate$_{LINE}$ is invalid, the time for the data to arrive at the client is estimated by determining a number of remaining packets once the server has finished writing to the current channel and dividing the number of remaining packets by a perceived packet rate for the web transaction (Rate$_{WEB-TRANS}$).

14. The apparatus according to claim 13 wherein the one or more processors are further configured to:
estimate perceived packet rates (Rate$_{INTER-REQUEST}$) for each new download of web page data to the client;
identify the perceived packet rates Rate$_{INTER-REQUEST}$ that are within a certain time range;
determine the estimated packet line rate (Rate$_{LINE}$) is invalid when a given number of the identified perceived packet rates Rate$_{INTER-REQUEST}$ are not within the time range; and
determine the packet line rate Rate$_{LINE}$ as an average of the identified perceived packet rates Rate$_{INTER-REQUEST}$ when a given number of Rate$_{INTER-REQUEST}$ are within the time range.

15. The apparatus according to claim 1 wherein the one or more processors are further configured to:
identify a client queuing time for sending a request for an initial web page;
identify a time required for the request to be received by the server;
identify a time for the server to process the request;
identify a time for the server to write responses to the request;
identify a time when the client receives the server responses;
identify a time for additional client requests for components of the initial web page to get to the server;
identify a time for the server to process the additional requests;
identify a time for the server to write additional responses to the additional requests to the connection;
identify a time when the client receives the additional responses from the server; and
use all of the identified times to estimate the client perceived latency time for the web transaction.

16. The apparatus according to claim 1 wherein the one or more processors are further configured to estimate a client latency for a given download of a complete web page as follows:

$$T_{QUEUING} + (1.5 \times RTT) + T_{CLIENT\_RECV-LAST\_RESPONSE} - T_{SERVE\_RECV-HTML},$$

wherein $T_{CLIENT\_RECV-LAST\_RESPONSE}$ is a time the client receives a last response from the server for the entire web page; and
$T_{SERVE\_RECV-HTML}$ is the time when the server receives a first request for HTML from the client.

17. A method comprising:
estimating, with a server, a queuing latency time for the server to accept a new request from a client and establish a connection with the client ($T_{QUEUING}$);
estimating, with the server, a time required for the client to receive a web page ($T_{cLIENT\_RECV}$) pursuant to the request;
identifying, with the server, a time when the server receives the request from the client ($T_{SERvE\_RECV}$), wherein the server is configured to provide the web page to the client responsive to the received request; and
estimating, with the server, a client perceived latency for a web transaction according to the estimated queuing latency time $T_{QUEUING}$, an estimated round trip time RTT, and a difference between the estimated time required for the client to receive the web page pursuant to the request $T_{CLIENT\_RECV}$ and the identified time the server receives the request $T_{SERVE\_RECV}$.

18. The method according to claim 17 further comprising estimating the client perceived latency according to:

$$T_{QUEUING} + (1.5 \times RTT) + T_{CLIENT\_RECV\-HTML} - T_{SERVE\_RECV},$$

wherein $T_{CLIENT\_RECV\-HTML}$ is an estimated time the client receives an Hyper Text Markup Language (HTML) portion of the web page, and $T_{SERVE\_RECV}$ is the time the server receives the request from the client for the HTML.

19. The method according to claim 17 further comprising:
identifying multiple different connections the client opens with the server for the web page transaction; and
using a last sent data on any of the multiple different connections for estimating the time $T_{CLIENT\_RECV}$ when the client receives the web page.

20. The method according to claim 17 further comprising:
measuring the queuing latency $T_{QUEUING}$ by identifying a time required for the server to accept a new Transmission Control Protocol/Internet Protocol (TCP/IP) connection request from the client.

21. The method according to claim 17 further comprising:
inserting a tag in web page Hyper Text Markup Language (HTML) sent to the client that causes the client to send a request back to the server when substantially all of the HTML for the web page is downloaded; and
using the client request to determine the time $T_{CLIENT\_RECV}$ when the client received the last of the web page data.

22. The method according to claim 17 further comprising:
identifying a ping time (T1) for a current web transaction;
using the ping time T1 as an initial estimate of the round trip time RTT between the server and the client;
searching logs for a smallest inter-request time (T2) for the web transaction, the inter-request time being a time between the server sending a response to the client and the server receiving a subsequent request back from the client on a same channel; and
using the smaller of the ping time T1 and the inter-request time T2 as an estimation of the round trip time RTT between the client and the server.

23. The method according to claim 17 further comprising:
estimating perceived packet rates ($Rate_{INTER\-REQUEST}$) for each new download of web page data to the client;
estimating connection packet rates ($Rate_{CONN}$) by averaging the perceived packet rates $Rate_{INTER\-REQUEST}$ for each particular connection to a particular channel of the web page transaction; and
estimating a web transaction packet rate ($Rate_{WEB\-TRANS}$) for the entire web transaction by averaging the estimated connection packet rates $Rate_{CONN}$ for the different connections used in the web page transaction.

24. The method according to claim 23 further comprising:
estimating the perceived packet rates $Rate_{INTER\-REQUEST}$ as follows:

$$Rate_{INTER\-REQUEST} = \frac{[RESPONSE\ SIZE_i \div PACKET\ SIZE]}{\max\{T_{SERVER\_RECVi+1} - T_{SERV\_SENDi} - 0.5 \times RTT, 0.5 RTT\}}$$

where:
RESPONSE SIZE$_i$ is a size of a web page response to the client,
PACKET SIZE is a size of packets sent from the server to the client,
$T_{SERVER\_RECVi+1}$ is a time the server receives a request subsequent to a present request i, and
$T_{SERV\_SENDi}$ is a time the server starts sending a response to the present request i.

25. The method according to claim 17 further comprising:
identifying a time T1 for the server to finish writing any remaining data for the web page to a channel, the time T1 including the estimated time it takes for the remaining data to arrive at the client once the server finishes writing the data to the channel;
identifying a time T2 for the server to receive a request for data from the client after writing the data, the time T2 offset by half the round trip time RTT;
inserting a sentry request in Hyper Text Markup Language (HTML) that causes the client to send a request back to the server when substantially all of the HTML for the web page has been downloaded;
identifying a time T3 when the server receives the sentry request back from the client and offsetting time T3 by half the round trip time RTT; and
estimating the time when the client receives the web page $T_{CLIENT\_RECV}$ as a minimum or earliest of T1, T2, and T3.

26. The method according to claim 17 further comprising:
identifying the channels that the client has opened with the server for the web transaction; and
estimating a time $T_{CLIENT\_REV\-LAST\_RESPONSE}$ when the client receives the entire web page that includes a Hyper Text Markup Language (HTML) portion of the web page and images or other components, if any, contained in the web page;
wherein a time $T_{CLIENT\_REV\-LAST\_RESPONSE}$ is selected as a time when the client receives the HTML for the web page when there is only one request for data on a current channel for the web transaction and the current channel is used requesting the HTML.

27. The method according to claim 26 further comprising:
estimating $T_{CLIENT\_REV\-LAST\_RESPONSE}$ as a time when the server finishes writing remaining data for the web page to the current channel plus an estimated time required for the remaining data to arrive at the client when there is more than one request for data is made on the current channel or when the current channel is not used for requesting the HTML.

28. The method according to claim 27 further comprising:
when a line rate ($Rate_{LINE}$) is valid, estimating the time when the data for the web page arrives at the client by determining a number of remaining packets once the server has finished writing to the current channel and dividing the number of remaining packets by the line rate $Rate_{LINE}$; and
when an estimated line rate $Rate_{LINE}$ is invalid, estimating the time for the data to arrive at the client by determining a number of remaining packets once the server has finished writing to the current channel and dividing the number of remaining packets by a perceived packet rate for the web transaction ($Rate_{WEB\-TRANS}$).

29. The method according to claim 28 further comprising:
estimating the perceived packet rates ($Rate_{INTER\-REQUEST}$) for each new download of web page data to the client;
identifying the perceived packet rates $Rate_{INTER\-REQUEST}$ that are within a certain time range;

determining the estimated packet line rate ($Rate_{LINE}$) is invalid when a given number of the identified perceived packet rates $Rate_{INTER-REQUEST}$ are not within the time range; and determining the packet line rate $Rate_{LINE}$ as an average of the identified perceived packet rates $Rate_{INTER-REQUEST}$ when a given number of $Rate_{INTER-REQUEST}$ are within the time range.

30. The method according to claim 17 further comprising:
identifying a client queuing time for sending a request for an initial web page;
identifying a time required for the request to be received by the server;
identifying a time for the server to process the request;
identifying a time for the server to write responses to the request;
identifying a time when the client receives the server responses;
identifying a time for additional client requests for components of the initial web page to get to the server;
identifying a time for the server to process the additional requests;
identifying a time for the server to write additional responses to the additional requests to the connection;
identifying a time when the client receives the additional responses from the server; and
using all of the identified times to estimate the client perceived latency time for the web transaction.

31. The method according to claim 17 further comprising estimating a client latency for a given download of the web page as follows:

$$T_{QUEUING}+(1.5 \times RTT)+T_{CLIENT\_RECV-LAST\_RESPONSE}-T_{SERVE\_RECV-HTML},$$

wherein $T_{CLIENT\_RECV-LAST\_RESPONSE}$ is a time the client receives a last response from the server for the entire web page; and
$T_{SERVE\_RECV-HTML}$ is the time when the server receives a first request for HTML from the client.

32. A network processing device, comprising:
a server to determine a time when the server receives a request from a client ($T_{SERVE\_RECV}$), wherein the server is configured to provide an entire web page to the client responsive to the received request, wherein the server is configured to estimate a client receive time for the client to receive the entire web page ($T_{CLIENT\_RECV}$) from the server during a web transaction, and wherein the server is configured to estimate a client perceived latency for the web transaction according to a difference between the estimated client receive time $T_{CLIENT\_RECV}$ and the determined time the server receives the request $T_{SERVE\_RECV}$.

33. The network processing device according to claim 32 wherein the one or more processors are further configured to estimate a main page latency for the client to receive Hyper Text Markup Language (HTML) for a main web page of the web page transaction according to:

$$T_{QUEUING}+(1.5 \times RTT)+T_{CLIENT\_RECV-HTML}-T_{SERVE\_RECV},$$

wherein $T_{CLIENT\_RECV-HTML}$ is an estimated time the client receives an HTML portion of the web page, and $T_{SERVE\_RECV}$ is the time the server receives a request from the client for the HTML.

34. The network processing device according to claim 32 wherein the server is configured to identify multiple different connections the client opens with the server for the web page transaction and use a last sent data on any of the multiple different connections for estimating the time $T_{CLIENT\_RECV}$ when the client receives the web page.

35. The network processing device according to claim 32 wherein the server is further configured to:
identify a time T1 for the server to finish writing any remaining data for the web page to a channel, the time T1 including the estimated time it takes for the remaining data to arrive at the client once the server finishes writing the data to the channel;
identify a time T2 for the server to receive a request for data from the client after writing the data, the time T2 offset by half the round trip time RTT;
identify a time T3 when the server receives a sentry request back from the client, the time T3 offset by half the round trip time RTT and the sentry request contained in Hyper Text Markup Language (HTML) sent by the server that prompts the client to send a request back to the server when substantially all of the HTML for the web page has been downloaded by the client;
estimate the time when the client receives the web page $T_{CLIENT\_RECV}$ as a minimum or earliest of T1, T2, and T3.

36. The network processing device according to claim 32 wherein the server is further configured to:
identify one or more channels that the client has opened with the server for the web transaction;
estimate a time ($T_{CLIENT\_REV-LAST\_RESPONSE}$) when the client receives the entire web page that includes a Hyper Text Markup Language (HTML) portion of the web page and images or other components, if any, contained in the web page, $T_{CLIENT\_REV-LAST\_RESPONSE}$ estimated as a time the client receives the HTML for the web page when there is only one request for data on a current channel for the web transaction and the current channel is used requesting the HTML.

37. The network processing device according to claim 36 wherein when more than one request for data is made on the current channel or when the current channel is not used for requesting the HTML, the server is configured to:
estimate $T_{CLIENT\_REV-LAST\_RESPONSE}$ as a time when the server finishes writing remaining data for the web page to the current channel plus an estimated time required for the remaining data to arrive at the client.

38. The network processing device according to claim 32 wherein the server is further configured to estimate a client latency for a given download of a complete web page as follows:

$$T_{QUEUING}+(1.5 \times RTT)+T_{CLIENT\_RECV-LAST\_RESPONSE}-T_{SERVE\_RECV-HTML},$$

wherein $T_{CLIENT\_RECV-LAST\_RESPONSE}$ is a time the client receives a last response from the server for the entire web page; and
$T_{SERVE\_RECV-HTML}$ is the time when the server receives a first request for HTML from the client.

\* \* \* \* \*

UNITED STATES PATENT AND TRADEMARK OFFICE
CERTIFICATE OF CORRECTION

PATENT NO. : 7,747,729 B2
APPLICATION NO. : 10/170460
DATED : June 29, 2010
INVENTOR(S) : Hanoch Levy It is certified that error appears in the above-identified patent and that said Letters Patent is hereby corrected as shown below:

At column 36, line 59, Claim 17, delete "(TcLIENT" and insert -- (TCLIENT --.

At column 36, line 62, Claim 17, delete "(TSERvE" and insert -- (TSERVE --.

Signed and Sealed this

Twenty-first Day of December, 2010

David J. Kappos
*Director of the United States Patent and Trademark Office*